United States Patent
Mantilla et al.

(10) Patent No.: US 8,822,870 B2
(45) Date of Patent: Sep. 2, 2014

(54) DIELECTRIC INSULATION MEDIUM

(71) Applicants: Javier Mantilla, Baden (CH); Max-Steffen Claessens, Untersiggenthal (CH); Nicola Gariboldi, Nussbaumen (CH); Stephan Grob, Baden (CH); Per Skarby, Wurenlos (CH); Thomas Alfred Paul, Wadenswil (CH); Navid Mahdizadeh, Baden (CH)

(72) Inventors: Javier Mantilla, Baden (CH); Max-Steffen Claessens, Untersiggenthal (CH); Nicola Gariboldi, Nussbaumen (CH); Stephan Grob, Baden (CH); Per Skarby, Wurenlos (CH); Thomas Alfred Paul, Wadenswil (CH); Navid Mahdizadeh, Baden (CH)

(73) Assignee: ABB Technology Ltd. (CH)

( * ) Notice: Subject to any disclaimer, the term of this patent is extended or adjusted under 35 U.S.C. 154(b) by 0 days.

(21) Appl. No.: 13/918,520

(22) Filed: Jun. 14, 2013

(65) Prior Publication Data

US 2013/0277334 A1     Oct. 24, 2013

Related U.S. Application Data

(63) Continuation of application No. PCT/EP2011/072606, filed on Dec. 13, 2011, and a continuation of application No. PCT/EP2010/069623, filed on Dec. 14, 2010.

(30) Foreign Application Priority Data

Dec. 22, 2010   (EP) .................................. 10196645
Oct. 7, 2011    (EP) .................................. 11184433

(51) Int. Cl.
    *H01H 33/02*     (2006.01)
(52) U.S. Cl.
    USPC .......................................... 218/157; 218/118
(58) Field of Classification Search
    None
    See application file for complete search history.

(56) References Cited

U.S. PATENT DOCUMENTS

| | | | |
|---|---|---|---|
| 3,150,245 A | 9/1964 | Leeds et al. | |
| 3,185,734 A | 5/1965 | Fawcett et al. | |
| 3,201,728 A | 8/1965 | McWhirter | |
| 3,881,766 A * | 5/1975 | Pratsch | 361/115 |
| 4,071,461 A | 1/1978 | Mears et al. | |
| 4,136,121 A | 1/1979 | Martini et al. | |
| 4,162,227 A | 7/1979 | Cooke | |
| 4,166,798 A | 9/1979 | Mastroianni et al. | |
| 4,175,048 A | 11/1979 | Christophorou et al. | |
| 4,288,651 A | 9/1981 | Wootton | |
| 4,296,003 A | 10/1981 | Harrold et al. | |

(Continued)

FOREIGN PATENT DOCUMENTS

| | | |
|---|---|---|
| CA | 2420574 C | 3/2002 |
| CA | 2516996 C | 9/2004 |

(Continued)

OTHER PUBLICATIONS

3M(tm) Novec(tm) 1230 Fire Protection Fluid—Brochure © 3M 2008; 6 pages.
3M(tm) Flüssigkeiten für das Wärmemanagement und Elektro-/Elektronik-Testen—Brochure © 3M 2010; 8 pages.
Yamamoto et al, "Applying a Gas Mixture Containing c-C4F8 as an Insulation Medium", IEEE Transactions on Dielectrics and electrical Insulation, vol. 8 No. 6, Dec. 2001 (abstract only—2 pages).

(Continued)

*Primary Examiner* — Truc Nguyen
(74) *Attorney, Agent, or Firm* — St. Onge Steward Johnston & Reens LLC

(57) ABSTRACT

A dielectric insulation medium including a fluoroketone containing 5 carbon atoms, in a mixture with a dielectric insulation gas component different from the fluoroketone, in particular air or an air component, the dielectric insulation medium, in particular the dielectric insulation gas, having a non-linearly increased dielectric strength that is larger than a sum of dielectric strengths of the gas components of the dielectric insulation medium.

76 Claims, 11 Drawing Sheets

(56) References Cited

U.S. PATENT DOCUMENTS

| | | | |
|---|---|---|---|
| 4,336,414 A * | 6/1982 | Suzuki et al. | 174/14 R |
| 4,350,838 A | 9/1982 | Harrold | |
| 4,440,971 A | 4/1984 | Harrold | |
| 5,399,718 A | 3/1995 | Costello et al. | |
| 5,466,877 A | 11/1995 | Moore | |
| 5,730,894 A | 3/1998 | Minor | |
| 5,858,065 A | 1/1999 | Li et al. | |
| 5,998,671 A | 12/1999 | Van Der Puy | |
| 6,276,190 B1 | 8/2001 | Zamfes | |
| 6,394,107 B1 | 5/2002 | Kesari et al. | |
| 6,403,149 B1 | 6/2002 | Parent et al. | |
| 6,478,979 B1 | 11/2002 | Rivers et al. | |
| 7,074,343 B2 | 7/2006 | Minor et al. | |
| 7,128,133 B2 | 10/2006 | Costello et al. | |
| 7,184,895 B2 | 2/2007 | Chetay et al. | |
| 7,314,576 B2 | 1/2008 | Minor et al. | |
| 7,390,427 B2 | 6/2008 | Costello et al. | |
| 7,416,679 B2 | 8/2008 | Minor et al. | |
| 7,736,529 B2 | 6/2010 | Luly et al. | |
| 7,742,283 B2 | 6/2010 | Hama et al. | |
| 7,816,618 B2 | 10/2010 | Uchii | |
| 7,923,630 B2 | 4/2011 | Richardson | |
| 8,080,185 B2 | 12/2011 | Luly et al. | |
| 8,245,512 B2 | 8/2012 | Schwiegel et al. | |
| 2002/0095262 A1 | 7/2002 | Chetay et al. | |
| 2003/0007543 A1 | 1/2003 | Grenfell et al. | |
| 2004/0056234 A1 | 3/2004 | Belt et al. | |
| 2004/0197474 A1 | 10/2004 | Vrtis et al. | |
| 2005/0127322 A1 | 6/2005 | Costello et al. | |
| 2005/0189325 A1 * | 9/2005 | Schweizer et al. | 218/118 |
| 2006/0210711 A1 | 9/2006 | Hayashi et al. | |
| 2007/0221626 A1 | 9/2007 | Uchii | |
| 2008/0135817 A1 | 6/2008 | Luly et al. | |
| 2009/0078680 A1 | 3/2009 | Franck et al. | |
| 2009/0095717 A1 | 4/2009 | Luly et al. | |
| 2009/0109604 A1 | 4/2009 | Yanabu et al. | |
| 2010/0096363 A1 * | 4/2010 | Ye et al. | 218/157 |
| 2011/0192821 A1 | 8/2011 | Dufournet | |
| 2011/0232870 A1 | 9/2011 | Flynn et al. | |
| 2012/0085735 A1 | 4/2012 | Uchii et al. | |
| 2012/0145521 A1 | 6/2012 | Glasmacher | |
| 2012/0152904 A1 * | 6/2012 | Hyrenbach et al. | 218/118 |
| 2012/0261383 A1 * | 10/2012 | Bose et al. | 218/52 |

FOREIGN PATENT DOCUMENTS

| | | |
|---|---|---|
| CN | 101197221 A | 6/2008 |
| DE | 548450 C | 6/1934 |
| DE | 641963 C | 2/1937 |
| DE | 3215234 A1 | 10/1983 |
| DE | 19519301 A1 | 11/1996 |
| DE | 202009009305 U1 | 11/2009 |
| DE | 102009025204 B3 | 11/2010 |
| EP | 0131922 A1 | 1/1985 |
| EP | 0545430 A1 | 6/1993 |
| EP | 0670294 B1 | 9/1995 |
| EP | 1085365 A2 | 3/2001 |
| EP | 1132746 A2 | 9/2001 |
| EP | 1146522 A1 | 10/2001 |
| EP | 1221612 A1 | 7/2002 |
| EP | 1261398 B1 | 12/2002 |
| EP | 1498941 A2 | 1/2005 |
| EP | 1764487 A1 | 3/2007 |
| EP | 1933432 A1 | 6/2008 |
| EP | 2525454 A2 | 11/2012 |
| FR | 2930019 A1 | 10/2009 |
| FR | 2955970 A1 | 8/2011 |
| GB | 753375 A | 7/1956 |
| GB | 1194431 A | 6/1970 |
| JP | 8306549 A | 11/1996 |
| JP | 2738997 B2 | 4/1998 |
| JP | 2879848 B1 | 4/1999 |
| JP | 11286679 A | 10/1999 |
| JP | 2000059935 A | 2/2000 |
| JP | 2000224722 A | 8/2000 |
| JP | 2001086611 A | 3/2001 |
| JP | 2005126480 A | 5/2005 |
| JP | 2007300716 A | 11/2007 |
| JP | 2010021263 A | 1/2010 |
| JP | 2010131584 A | 6/2010 |
| JP | 2010171173 A | 8/2010 |
| KR | 20070080895 A | 8/2007 |
| RU | 2276164 C2 | 5/2006 |
| WO | 0024814 A1 | 5/2000 |
| WO | 0105468 A2 | 1/2001 |
| WO | 0250173 A2 | 6/2002 |
| WO | 02086191 A1 | 10/2002 |
| WO | 02086192 A1 | 10/2002 |
| WO | 02103319 A1 | 12/2002 |
| WO | 03022981 A1 | 3/2003 |
| WO | 2004090177 a1 | 10/2004 |
| WO | 2007013169 A1 | 2/2007 |
| WO | 2007075804 A1 | 7/2007 |
| WO | 2007136948 A2 | 11/2007 |
| WO | 2008073790 A2 | 6/2008 |
| WO | 2010108934 A1 | 9/2010 |
| WO | 2010142346 A1 | 12/2010 |
| WO | 2010146022 A1 | 12/2010 |
| WO | 2011019456 A1 | 2/2011 |
| WO | 2011054870 A1 | 5/2011 |
| WO | 2011090992 A1 | 7/2011 |
| WO | 2011119421 A1 | 9/2011 |
| WO | 2011119456 A1 | 9/2011 |
| WO | 2012038442 A1 | 3/2012 |
| WO | 2012038443 A1 | 3/2012 |

OTHER PUBLICATIONS

Cartwright, et al.; "Barrow Offshore Windfarm Design & Build of UKs First OWF Sub-Station"; Vestas KBR; Oct. 2005; 26 pages.

Kynast, et al.; "Basic investigations concerning equipment with liquefied SF6 under extreme low temperatures"; Technical Colloquium; 2011; 8 pages.

Milbrath; "Development of 3MTM NovecTM 612 Magnesium Protection Fluid as a Substitute for SF6 over Molten Magnesium"; Presented at the International Conference on SF6 and the Environment, Nov. 21-22, 2002.

International Preliminary Report on Patentability Application No. PCT/EP2011/072606 Completed: Feb. 27, 2013 47 pages.

International Search Report & Written Opinion of the International Searching Autority Application No. PCT/EP2011/072606 Completed: May 10, 2012; Mailing Date: May 22, 2012 17 pages.

Smith, et al.; "Perfluoroisopropyl Ketones—The Chemistry of Carbonyl Fluoride. II. Synthesis of Perfluoroisopropyl Ketones"; Journal of the American Chemical Society (J. Am. Chem. Soc.), vol. 84, pp. 4285-4288, 1962.

Seimens Alarm Brochure—2005; 40 pages.

Abb, et al.; "Valhall Re-Development Project, Power From Shore"; Mar. 17, 2010; 5 pages.

Anonymous: "CBWatch-2 Modular Circuit Breaker Monitoring System"; Alstom Product Brochure; Sep. 1, 2010; 4 pages.

Niemeyer, Lutz. "CIGRE Guide for SF6 gas mixtures. Application and Handling in electric power Equipment." ABB Corp Research Cetre; 2000; 8 pages.

Hillers, et al.; "Control, Monitoring and Diagnostics for High Voltage GIS"; IEE Colloquim on GIC (Gas-Insulated Switchgear); Nov. 14, 1995; pp. 6/1-6/4.

Brand, "Dielectric Strength, Boiling Point and Toxicity of Gases—Different Aspects of the Same Basic Molecular Properties"; Oct. 1982; pp. 451-456.

3M(tm); "Fluorochemicals in Heat Transfer Applications"; Jun. 21, 2000; 27 pages.

Tuma, "Fluoroketone C2F5C(O)CF(CF3)2 as a Heat Transfer Fluid for Passive and Pumped 2-Phase Applications"; 24th IEEE Semi0Therm Symposium; 2008; 8 pages.

Christophorou, et al.; "Gases for electrical insulation and arc interruption : possible present and future alternatives to pure SF6"; NIST Technical Note 1425; Nov. 1997; 48 pages.

* cited by examiner

DIELECTRIC INSULATION MEDIUM

FIELD OF THE INVENTION

The present invention relates to a dielectric insulation medium, to the use of a specific mixture as a dielectric insulation medium as well as to the use of the dielectric insulation medium, to an apparatus for the generation and/or the transmission and/or the distribution and/or the usage of electrical energy, and to a method for dimensioning an electrical apparatus.

BACKGROUND OF THE INVENTION

Dielectric insulation media in liquid or gaseous state are conventionally applied for the insulation of an electrical active part in a wide variety of electrical apparatuses, such as switchgears or transformers.

In medium or high voltage metal-encapsulated switchgears, for example, the electrically active part is arranged in a gas-tight housing, which defines an insulating space, said insulation space comprising an insulation gas usually with a pressure of up to several bars and separating the housing from the electrically active part, thus preventing flow of electrical current between housing and active parts. Metal-encapsulated switchgears allow for a much more space-saving construction than switchgears which are mounted outdoors and are insulated by ambient air. For interrupting the current in a high voltage switchgear, the insulating gas further functions as an arc extinction gas.

Conventional insulation gases with high insulation and switching performance have some environmental impact when released into the atmosphere. So far, the high global warming potential (GWP) of these insulation gases has been coped with by strict gas leakage control in gas-insulated apparatuses and by very careful gas handling.

Conventional environment-friendly insulation gases, such as dry air or $CO_2$, have quite a low insulation performance, thus requiring a very unfavourable increase in gas pressure and/or insulation distances.

For the reasons mentioned above, efforts have been made in the past to replace the conventional insulation gases by suitable substitutes.

For example, WO 2008/073790 discloses a dielectric gaseous compound which—among other characteristics—has a low boiling point in the range between −20° C. to −273° C., is preferably non-ozone depleting and which has a GWP of less than about 22,200 on a 100 year time scale. Specifically, WO 2008/073790 discloses a number of different compounds which do not fall within a generic chemical definition.

Further, U.S. Pat. No. 4,175,048 relates to a gaseous insulator comprising a compound selected from the group of perfluorocyclohexene and hexafluoroazomethane, and EP-A-0670294 discloses the use of perfluoropropane as a dielectric gas.

EP-A-1933432 refers to trifluoroiodomethane ($CF_3I$) and its use as an insulating gas in a gas-insulated switchgear. In this regard, the document mentions both the dielectric strength and the interrupting performance to be important requirements for an insulating gas. $CF_3I$ has according to EP-A-1933432 a GWP of 5 and is thus considered to cause relatively low environmental impact. However, because of its relatively high boiling point of −22° C., $CF_3I$ is taught to be mixed with $CO_2$. The proposed gas mixtures have only around 80% of the specific insulation performance of a pure conventional insulation medium. This has to be compensated by an increased gas pressure and/or by larger insulation distances.

In the search for a suitable substitute, it has been found that by using fluoroketones having from 4 to 12 carbon atoms, an insulation medium can be obtained which has high insulation capabilities, in particular a high dielectric strength, and at the same time an extremely low global warming potential. This invention has previously been filed as international patent application No. PCT/EP2009/057294.

German Utility Model DE 20 2009 009 305 U1 and German Patent DE 10 2009 025 204 B3 also relate to a switching device having an encapsulation that is filled with a filling medium comprising a fluoroketone.

Despite of the good dielectric strength of the fluoroketones according to international patent application No. PCT/EP2009/057294, the insulation performance of the respective insulation medium comprising the fluoroketone is often limited due to the relatively high boiling points of the fluoroketones.

This is particularly the case for applications in a low temperature environment. In this case, only a relatively low saturated vapour pressure of the fluoroketone can be maintained without fluoroketone becoming liquefied. This limits the achievable fluoroketone molar ratio in the gaseous phase and would make necessary an increased filling pressure with conventional insulating gases.

For example, the minimal permissible operating temperature of high or medium voltage gas-insulated switchgear (HV-GIS or MV-GIS) can be typically −5° C. At this temperature, for obtaining a dielectric performance comparable to conventional high-performance insulation media, the required filling pressure of an insulation medium comprising e.g. a fluoroketone having 6 carbon atoms, e.g. $C_2F_5C(O)CF(CF_3)_2$ or dodecafluoro-2-methylpentan-3-one, may still be relatively high and could exceed the filling pressure that can be withstood by usual housing constructions, which is typically about 7 bar for HV GIS applications.

Alternatively or additionally to increasing the filling pressure, the system can be heated (as shown in our PCT/EP2009/057294). If using for example a pure fluoroketone having 6 carbon atoms, e.g. $C_2F_5C(O)CF(CF_3)_2$ or dodecafluoro-2-methylpentan-3-one, as the insulation medium, heating to more than 50° C. would be required to achieve a sufficient saturated vapour pressure of the fluoroketone and to obtain the desired insulation performance for more demanding high voltage applications. Such heating is not always feasible or recommended both for economic and ecologic and reliability reasons.

SUMMARY OF THE INVENTION

The object to be achieved by the present invention is thus to provide an insulation medium having a very low GWP, having at the same time high insulation capabilities also at relatively low operating temperatures and at moderate filling pressures, thus allowing to achieve an insulation performance comparable to the one of high-performance insulation media having a higher GWP.

This object is achieved by the subject-matter of the independent claims, namely by the insulation medium, the uses, the apparatus, and the dimensioning method for such an apparatus. Exemplary embodiments of the invention are given in the dependent claims.

The present invention thus relates to a dielectric insulation medium comprising a) a fluoroketone containing exactly 5 carbon atoms, here briefly named "fluoroketone a)", in a mixture with b) a dielectric insulation gas component, here briefly named "dielectric insulation gas component b)", different from said fluoroketone a).

In the context of the present invention, the term "different from" shall be understood broadly to encompass other dielectric insulation gas components b), that do not stem from the group of chemical compounds falling under the definition of fluoroketones, in particular fluoroketones having exactly 5 carbon atoms. In other words, the other dielectric insulation gas component b) shall comprise any gas or gas component that is not a fluoroketone having exactly 5 carbon atoms. In still other words, the dielectric insulation medium is comprised of less than 100% of the fluoroketone a). For the sake of clarity, the term "dielectric insulation gas component b)" is to be understood such that it may comprise one single gas component or may comprise a mixture of at least two gas component elements b1), b2), . . . bn).

Specifically, the dielectric insulation gas component b) has a low boiling point, more specifically an atmospheric boiling point of at least 50 K, preferably at least 70 K, in particular at least 100 K, below an atmospheric boiling point of the fluoroketone a). The term "boiling point" or "atmospheric boiling point" as used in the context of the present invention is to be understood as boiling point at atmospheric pressure, i.e. at about 1 bar.

Typically, the dielectric insulation gas component b) is inert and/or non-toxic and/or non-flammable. Preferably, it has a dielectric strength of more than 10 kV/(cm bar), preferably more than 20 kV/(cm bar), in particular more than 30 kV/(cm bar). In exemplary embodiments, the dielectric insulation gas component b) is a carrier gas which itself has a lower dielectric strength than the fluoroketone a). Its ozone depletion potential is preferably 0.

The invention is based on the surprising finding that, if a fluoroketone containing exactly 5 carbon atoms is used as a first dielectric insulation gas component in a mixture with a further dielectric insulation gas component, for example air or carbon dioxide, the resulting dielectric insulation performance or dielectric strength of the mixture is much higher than expected from linearly adding the dielectric strength of each separate gas component of the mixture. Thus, a strong over-proportional or nonlinear increase of the dielectric strength of the insulation gas mixture containing fluoroketone a) and a different or further gas component b) is provided for the first time. Such non-linear increase in dielectric strength of the mixture according to the invention was hitherto unknown.

The finding of the non-linear effect achieved by the dielectric insulation medium of the present invention has been most surprising; this is e.g. apparent when comparing the dielectric strength of the mixture of the present invention with the mixtures disclosed in FIG. 1.

According to a preferred embodiment, the dielectric insulation medium, in particular the dielectric insulation gas, thus has a non-linearly increased dielectric strength that is larger than the sum of dielectric strengths of the gas components of the dielectric insulation medium. It is thereby particularly preferred that the dielectric insulation gas component b) is a carrier gas that is present in a larger quantity than the fluoroketone a).

In other words, a type and amount of the gas component b) and an amount of the fluoroketone a) are preferably chosen such that the non-linear increase of the dielectric strength of the insulation medium over the sum of the dielectric strengths of the gas components of the dielectric insulation medium is achieved.

In an exemplary embodiment of the dielectric insulation medium according to the present invention, a breakdown field strength Ebd is established in a system, said Ebd being defined by the following equation:

$$Ebd = s \cdot (p_a \cdot E_{crit,a} + p_b \cdot E_{crit,b})$$

in which $p_a$ is a partial pressure of the fluoroketone a), $p_b$ is a partial pressure of the dielectric insulation gas component b), $E_{crit,a}$ is a pressure-reduced electric breakdown field strength of the fluoroketone a), $E_{crit,b}$ is a pressure-reduced electric breakdown field strength of the dielectric insulation gas component b), and s is a synergy factor $Ebd_{measured}/Ebd_{lin.calc.}$ with $Ebd_{measured}$ being a measured or actual breakdown field strength of the dielectric insulation medium, in particular of the mixture of its gas components, and $Ebd_{lin.calc}$ being a linearly calculated sum of the electrical breakdown field strengths of the fluoroketone a) and the dielectric gas component b), wherein the mixture is chosen such that the synergy factor s is greater than 1.

In other words, the mixture shall contain at least one specific dielectric gas component b), in particular a carrier gas, that together with the fluoroketone a) provides a non-linear increase in the dielectric strength over the arithmetic sum of the dielectric strengths of the gas components present in the mixture, which results in the synergy factor s in the above equation being greater than 1.

In an exemplary embodiment, a pronounced non-linear increase is achieved for fluoroketone a) containing exactly 5 carbon atoms in a mixture with air as dielectric insulation gas component b) in a ratio of $p_a$ to $p_b$ ranging from 0.04:1 to 0.6:1.

In the above equation the breakdown field strength Ebd of the dielectric insulation medium, in particular of the mixture of its gas components, the pressure-reduced electric breakdown field strength $E_{crit,a}$ of the fluoroketone a), and the pressure-reduced electric breakdown field strength $E_{crit,b}$ of the dielectric insulation gas component b) are determined in a first similar, preferably first identical, measurement apparatus, and in particular are determined in an electrical apparatus in which the dielectric insulation medium is to be used.

Furthermore, in determining the synergy factor (or synergy coefficient), the measured breakdown field strength $Ebd_{measured}$ of the dielectric insulation medium, in particular of the mixture of its gas components, and the linearly calculated sum $Ebd_{lin.calc}$ of the electric breakdown field strengths of the fluoroketone a) and the dielectric gas component b) are determined in a second similar, preferably second identical, measurement apparatus, and in particular are determined in an electrical apparatus in which the dielectric insulation medium is to be used. Furthermore, the first and second measurement apparatus can be the same.

As mentioned $E_{crit,a}$ and $E_{crit,b}$ are defined as the pressure-independent electric breakdown field strength of the respective component under certain measurement conditions, such as electrode configuration, surface roughnesses, polarity, etc. Typically, a meaningful synergy factor can be determined, if such measurement conditions are kept constant while exchanging or mixing the gas components a) and b). $E_{crit,a}$ and $E_{crit,b}$ thus designate the electric breakdown field strengths obtained for the components a) and b) in their pure form and normalized to 1 bar pressure.

$Ebd_{lin.calc.}$ can also be expressed as $p_a \cdot E_{crit,a} + p_b \cdot E_{crit,b}$, with $p_a$, $p_b$, $E_{crit,a}$ and $E_{crit,b}$ having the meaning mentioned herein.

As will be shown in detail below it is found, that the synergy factor s is most prominently dependent on the ratio of the partial pressure $p_a$ of the fluoroketone a) to the partial pressure $p_b$ of the dielectric insulation gas component b).

In embodiments of the invention, the type and amount of the gas component b) and the amount of the fluoroketone a) are chosen such that the synergy factor s is greater than 101%, preferred greater than 105%, more preferred greater than 110%, and most preferred greater than 115%. Thus, it has been found that the synergy factor is a function of the type of gas component b), as well.

The term "fluoroketone" as used herein shall be interpreted broadly and shall encompass both perfluoro-ketones and hydrofluoroketones. The term shall also encompass both saturated compounds and unsaturated compounds including double and/or triple bonds. The at least partially fluorinated carbon backbone and, respectively, the alkyl chains of the fluoroketones can be linear or branched.

The term "fluoroketone" shall also encompass fluoroketones having a cyclic carbon backbone. The term "fluoroketone" shall signify a chemical composition that comprises a carbonyl-group and on each side of it an alkyl-group. The term "fluoroketone" may comprise additional in-chain hetero-atoms (i.e. hetero-atoms attached to the chemical structure comprising a carbonyl-group and on each side of it an alkyl group), e.g. may comprise at least one hetero-atom being part of the carbon backbone and/or being attached to the carbon backbone. In exemplary embodiments, the fluoroketone a) and/or the fluoroketone c) shall have no hetero-atom. The term "fluoroketone" shall also encompass fluorodiketones having two carbonyl-groups or fluoroketones having more than two carbonyl-groups. In exemplary embodiments, the fluoroketone a) and/or the fluoroketone c) shall be fluoromonoketones.

According to specific embodiments, the fluoroketone a) is a perfluoroketone, and/or the fluoroketone a) has a branched alkyl chain, in particular an at least partially fluorinated alkyl chain, and/or the fluoroketone a) is a fully saturated compound. It is understood that a single fully saturated fluoroketone a), i.e. a fluoroketone without any double bond or triple bond, or a mixture of two or more fully saturated fluoroketones may be comprised.

According to a preferred embodiment, the fluoroketone a) is at least one compound selected from the group consisting of the compounds defined by the following structural formulae in which at least one hydrogen atom is substituted with a fluorine atom:

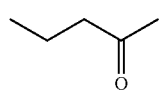

(Ia)

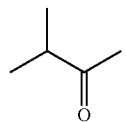

(Ib)

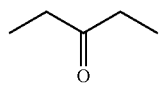

(Ic)

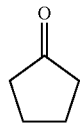

(Id)

In other exemplary embodiments, the dielectric insulation gas component b) is a bulk gas or buffer gas or carrier gas. Such carrier gas component b) can be present in a larger quantity than the fluoroketone a). As additional or alternative quantitative restriction to this, in still other embodiments a molar ratio of fluoroketone a) to gas component b) can be larger than 1:20, preferably larger than 1:10, more preferably larger than 1:5, most preferred larger than 1:2. Furthermore, the carrier gas component b) shall be an environmentally friendly gas. For example, the gas component b) can have a GWP on a 100 year time scale of less than 1000, preferably less than 300, preferably less than 100, preferably less than 50, preferably less than 10, more preferred less than 5, even more preferred less than 3, further more preferred less than 2, and most preferred less than 1.5. Furthermore, the carrier gas component b) may comprise or consist of di-atomic molecules, that are preferably chemically stable under ambient conditions and, in particular, under normal operating condition of gas-insulated electrical equipment, such as in a temperature range of −40° C. to +105° C. and under few to several bars gas pressure. Furthermore, the carrier gas component b) can itself be a gas mixture, such as air or an air component and for example nitrogen, oxygen carbon dioxide or a noble gas. In the context of the invention of the present application, the term "air" shall encompass and in particularly mean "technical air" or "dry air".

According to a further embodiment, the dielectric insulation gas component b) comprises molecules with less atoms than present in the fluoroketone a), in particular comprising tri-atomic and/or di-atomic molecules or consisting of tri-atomic and/or di-atomic molecules.

It has surprisingly been found that a fluoroketone comprising exactly 5 carbon atoms and/or a fluoroketone comprising exactly 6 carbon atoms shows when present in a mixture with air, nitrogen and/or carbon dioxide, a very pronounced non-linear increase in dielectric strength over an arithmetic sum of the dielectric strengths of the components of the mixture.

This non-linear increase is of particular relevance when a fluoroketone containing exactly 5 carbon atoms is used. As mentioned above, fluoroketones containing 5 carbon atoms have the advantage of a relatively low boiling point, allowing to have a relatively high molar fraction and a relatively high partial pressure, respectively, of the fluoroketone in the insulation medium without facing the problem of liquefaction even at low temperatures.

Therefore, in preferred embodiments, a fluoroketone containing exactly 5 carbon atoms is chosen in a mixture with air, nitrogen, carbon dioxide or mixtures thereof as dielectric gas insulation component b) in order to achieve the desired non-linear increase in dielectric strength.

Specifically, the present invention also relates to a dielectric insulation medium comprising
  a) a fluoroketone a) containing exactly 5 carbon atoms, in a mixture with b) a dielectric insulation gas component b) different from said fluoroketone a)

the dielectric insulation gas component b) being or comprising air or an air component, in particular nitrogen.

It has been found that by using air, nitrogen and/or carbon dioxide as dielectric insulation gas component b) a very pronounced non-linear effect can be achieved; respective mixtures of the fluoroketone a) with one or more of these insulation gas components b) are thus particularly useful for insulation purposes.

It has also been found that a mixture comprising fluoroketone a) and carbon dioxide as dielectric insulation component b) is particularly useful for the use as an arc-extinguishing gas in e.g. a circuit breaker, in particular a high voltage circuit breaker.

Thus, according to a further preferred embodiment, the dielectric insulation gas component b) comprises, and in particular is, carbon dioxide.

In this regard, it has further been found that due to the use of oxygen in an arc-extinguishing gas carbon deposition on the electrodes can be efficiently reduced or avoided.

By using oxygen in the arc-extinguishing gas, also the amount of toxic arcing by-products, such as by-products which otherwise might be present after the switching operation, can be reduced.

Thus, according to a further preferred embodiment, the dielectric insulation gas component b) comprises, and in particular is, oxygen. Of course, pure oxygen as well as an oxygen containing gas mixture, in particular air, can be used in this regard.

Preferably, the further dielectric gas component b), in particular the carrier gas, is not $SF_6$ or does not comprise $SF_6$.

Without being bound to any theory, a possible mechanism of the nonlinearly increased dielectric strength according to this invention can be that the dielectric gas component b) serves for decelerating electrons, which stem from dielectric breakdown, and the fluoroketone a) serves for capturing such decelerated electrons, thus establishing an excessively high dielectric strength of the gas mixture containing fluoroketone a) and carrier gas b). The dielectric insulation gas component b) according to the present invention shall thus in particular encompass gases which are capable of decelerating electrons.

For example, by adding about 350 mbar, here more precisely 325 mbar, of 1,1,1,3,4,4,4-heptafluoro-3-(trifluoromethyl)butan-2-one (or decafluoro-3-methylbutan-2-one) $CF_3C(O)CF(CF_3)_2$ to 4650 mbar technical air (comprising approximately 80% nitrogen and 20% oxygen), a much higher breakdown voltage can be achieved than would have been expected by merely taking into account the field strengths and molar ratios of the single gas components of the gas mixture. This will be shown in more detail in connection with the figures below.

Due to this synergistic effect, an insulation medium having very high insulation capabilities and at the same time a very low GWP can be obtained. Ultimately, this allows a conventional high-performance insulation gas to be substituted with an insulation medium having a very low GWP, without requiring heating of the system or setting the filling pressure above conventionally used pressure values.

Compared to fluoroketones having a greater chain length with more than 5 carbon atoms, fluoroketones containing 5 carbon atoms have the advantage of a relatively low boiling point, allowing to have a relatively high molar fraction of such 5-carbon fluoroketones in the insulation medium and avoiding the problem of liquefaction even at low temperatures.

Fluoroketones containing 5 or more carbon atoms are further advantageous, because they are generally non-toxic. This is in contrast to fluoroketones having less than 4 carbon atoms, such as hexafluoroacetone (or hexafluoropropanone), which are toxic and very reactive.

In embodiments of this invention, the fluoroketones having a branched alkyl chain are preferred, because their boiling points are lower than the boiling points of the corresponding compounds (i.e. compounds with same molecular formula) having a straight alkyl chain.

According to a preferred embodiment, the fluoroketone a) is a perfluoroketone, in particular has the molecular formula $C_5F_{10}O$, i.e. is fully saturated without double or triple bonds. The fluoroketone a) may more preferably be selected from the group consisting of 1,1,1,3,4,4,4-heptafluoro-3-(trifluoromethyl)butan-2-one (also named decafluoro-3-methylbutan-2-one), 1,1,1,3,3,4,4,5,5,5-decafluoropentan-2-one, 1,1,1,2,2,4,4,5,5,5-decafluoropentan-3-one, 1,1,1,4,4,5,5,5,-octafluoro-3-bis(trifluoromethyl)-pentan-2-one; and most preferably is 1,1,1,3,4,4,4-heptafluoro-3-(trifluoromethyl)butan-2-one.

1,1,1,3,4,4,4-heptafluoro-3-(trifluoromethyl)butan-2-one can be represented by the following structural formula (I):

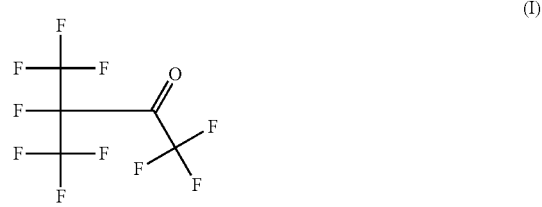 [SMILES: O=C(C(F)(F)F)C(F)(C(F)(F)F)C(F)(F)F]

(I)

1,1,1,3,4,4,4-heptafluoro-3-(trifluoromethyl)butan-2-one, falling under and here briefly cited by the generic term "C5-ketone" (=fluoroketone containing exactly 5 carbon atoms), with molecular formula $CF_3C(O)CF(CF_3)_2$ or $C_5F_{10}O$, has been found to be particularly preferred for high and medium voltage insulation applications, because it has the advantages of high dielectric insulation performance, in particular in mixtures with the dielectric carrier gas component b), has very low GWP and has a low boiling point. It has an ozone depletion potential of 0 and is practically non-toxic.

According to a further preferred embodiment, the molar fraction of the C5-ketone in the insulation medium ranges from about 5% to about 15%, preferably from about 6% to about 10%, when conventional high voltage GIS pressure filling values are used, and from about 10% to 40%, when conventional medium voltage GIS pressure filling values are used. Such molar ratio ranges have the advantage that liquefaction of the fluoroketone does not occur, even if the insulation medium is used in a low temperature environment, for example down to temperatures of less than 0° C., in particular down to −5° C.

According to other embodiments, the molar fraction of the C5-ketone in the insulation medium is larger than 1%, preferably larger than 2%, more preferred larger than 3%, even more preferred larger than 3.5%.

According to other embodiments, the C5-ketone is in gaseous phase in the insulation medium under operating conditions.

Preferably, the dielectric insulation medium is a dielectric insulation gas under over-pressure of less than 8 bar, preferably less than 7.5 bar, more preferably less than 7 bar, in particular equal or less than 6.5 bar; or wherein the dielectric insulation medium is a dielectric insulation gas under over-pressure of less than 2.5 bar, preferably less than 2.0 bar, more preferably less than 1.5 bar, in particular equal to or less than 1.2 bar.

According to a particularly preferred embodiment, even higher insulation capabilities can be achieved by combining the mixture of fluoroketone a) and dielectric insulation gas component b) according to the present invention with
c) a further fluoroketone, here briefly named "fluoroketone c)", different from the fluoroketone a), and preferably also different from the dielectric insulation gas component b).

Again, "different from" means not falling under the definition of fluoroketone a) having exactly 5 carbon atoms, and preferably not falling under the definition of insulation gas component b), in particular not being a bulk gas or buffer gas or carrier gas.

As will be shown in connection with the Figures below, a pronounced non-linear increase has been determined for embodiments for which fluoroketone c), specifically a fluoroketone containing 6 carbon atoms, is different from the dielectric insulation gas component b), in other words for media which apart from fluoroketones a) and c) comprise a dielectric insulation gas component b) other than fluoroketones a) and c).

Thus, an insulation medium can be achieved having more than one fluoroketone, each contributing by itself to the dielectric strength of the dielectric insulation medium. In this embodiment, it is particularly preferred that each fluoroketone comprised in the mixture has a partial pressure that corresponds at least to its saturated vapour pressure at least at the minimal operating temperature of the dielectric insulation medium or of the electrical apparatus comprising the dielectric insulation medium, respectively; thus a high total molar ratio of the fluoroketones can be obtained and maintained in the gaseous phase, which allows to obtain a very high dielectric strength of the dielectric insulation medium.

Said further fluoroketone c) preferably contains exactly 5 carbon atoms or exactly 6 carbon atoms or exactly 7 carbon atoms or exactly 8 carbon atoms, and more preferably contains from 5 to 7 carbon atoms, most preferably exactly 6 carbon atoms.

Preferably, the further fluoroketone c) is at least one compound selected from the group consisting of the compounds defined by the following structural formulae in which at least one hydrogen atom is substituted with a fluorine atom:

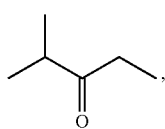
(IIa)

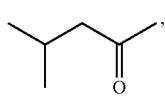
(IIb)

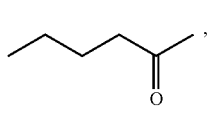
(IIc)

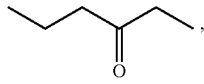
(IId)

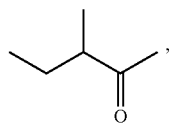
(IIe)

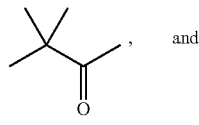 and
(IIf)

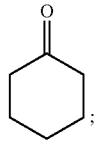
(IIg)

and/or is at least one compound selected from the group consisting of the compounds defined by the following structural formulae in which at least one hydrogen atom is substituted with a fluorine atom:

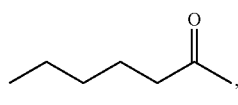
(IIIa)

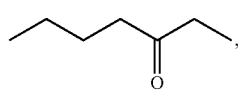
(IIIb)

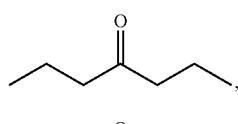
(IIIc)

(IIId)

(IIIe)

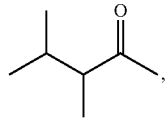
(IIIf)

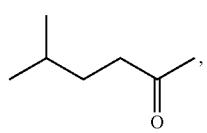
(IIIg)

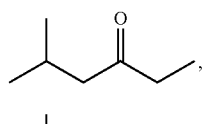
(IIIh)

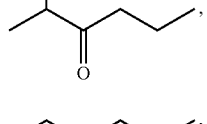
(IIIi)

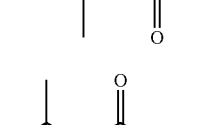

-continued

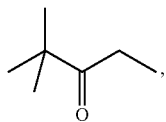
(IIIj)

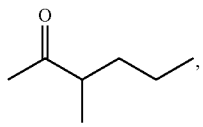
(IIIk)

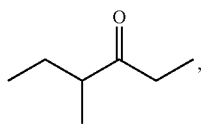
(IIIl)

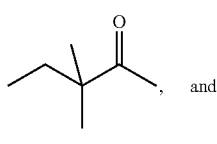
(IIIm)
and

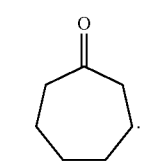
(IIIn)

named dodecafluoro-
cycloheptanone

The present invention encompasses each combination of any of the compounds according to structural formulae Ia to Id with any of the compounds according to structural formulae IIa to IIg and/or IIIa to IIIn.

More preferably, the fluoroketone c) contains exactly 6 carbon atoms; such a fluoroketone is non-toxic, with outstanding margins for human safety.

In embodiments, the fluoroketone c), like the fluoroketone a), is a perfluoroketone, and/or the fluoroketone c) has a branched alkyl chain, in particular an at least partially fluorinated alkyl chain, and/or the fluoroketone c) contains fully saturated compounds.

In particular, the fluoroketone c) has the molecular formula $C_6F_{12}O$, i.e. is fully saturated without double or triple bonds. More preferably, the fluoroketone c) can be selected from the group consisting of 1,1,1,2,4,4,5,5,5-nonafluoro-2-(trifluoromethyl)pentan-3-one (also named dodecafluoro-2-methylpentan-3-one), 1,1,1,3,3,4,5,5,5-nonafluoro-4-(trifluoromethyl)pentan-2-one (also named dodecafluoro-4-methylpentan-2-one), 1,1,1,3,4,4,5,5,5-nonafluoro-3-(trifluoromethyl)pentan-2-one (also named dodecafluoro-3-methylpentan-2-one), 1,1,1,3,4,4,4-heptafluoro-3-bis-(trifluoromethyl)butan-2-one (also named dodecafluoro-3,3-(dimethyl)butan-2-one), dodecafluorohexan-2-one and dodecafluorohexan-3-one, and particularly is the mentioned 1,1,1,2,4,4,5,5,5-nonafluoro-2-(trifluoromethyl)pentan-3-one.

1,1,1,2,4,4,5,5,5-Nonafluoro-2-(trifluoromethyl)pentan-3-one (also named dodecafluoro-2-methylpentan-3-one) can be represented by the following structural formula (II):

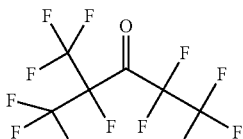
(II)

1,1,1,2,4,4,5,5,5-Nonafluoro-4-(trifluoromethyl)pentan-3-one, falling under and here briefly cited by the more generic term "C6-ketone" (=fluoroketone comprising exactly 6 carbon atoms), with molecular formula $C_2F_5C(O)CF(CF_3)_2$ has been found to be particularly preferred for high voltage insulation applications because of its high insulating properties and its extremely low GWP. It has an ozone depletion potential of 0 and is non-toxic (LC50 4 hours of about 100,000 ppm). Thus, the environmental impact is much lower than with conventional insulation gases, and at the same time outstanding margins for human safety are achieved.

Preferably, the molar fraction of the fluoroketone c) in the insulation medium shall range from about 1% to about 15%, preferably from about 1% to about 10%, more preferred from about 1% to about 4%, most preferred from 1% to 3%, in order to avoid liquefaction of the fluoroketone at low temperatures, for example down to temperatures of less than 0° C., for example down to −5° C.

In embodiments, the molar fraction of the fluoroketone c) in the insulation medium is chosen to be larger than 0.1%, preferably larger than 0.5%, more preferably larger than 1%, in particular larger than 2%.

Preferably, the molar fraction of the fluoroketone c) in the insulation medium ranges from 1% to 15%, more preferably from 1% to 10%, most preferred from 1% to 3%.

It has surprisingly been found that through a mixture of the C5-ketone and the C6-ketone with the dielectric insulation gas component b) an insulation medium is created which shows at moderate filling pressures of equal or less than 7 bar comparable insulation performance like $SF_6$ at 4.5 bars or less. Such moderate filling pressure is generally withstood by conventional housing constructions that are usually rated for withstanding lock out pressures up to about 8 bars.

In the particular embodiment, when mixing the C5-ketone with the C6-ketone and air, a dielectric insulation medium is found which provides a permissible filling pressure and sufficient dielectric strength without requiring any heating even at low operating temperatures, in particular down to a minimum operating temperature as low as −5° C. Due to the very low GWP and zero ODP of the 5-carbon and 6-carbon fluoroketone admixtures, the resulting insulation medium is also fully acceptable from an environmental perspective.

As mentioned above, the insulation medium according to the present invention is particularly useful in electrical applications. The present invention thus also relates to the use of the above-described combination of components as a dielectric insulation medium in an apparatus for the generation and/or transmission and/or distribution and/or usage of electrical energy.

Furthermore, throughout this application, any disclosure of and claim on the dielectric insulation medium comprising a fluoroketone a) according to the present invention and to any embodiments is also a disclosure of the use of such a fluoroketone a) in or as a dielectric insulation medium, and this use is explicitly disclosed herewith and may be claimed as a use claim, in particular by replacing the term "Dielectric insulation medium comprising a fluoroketone a)" with the term "Use of a fluoroketone a) as a dielectric insulation medium".

Likewise, the present invention also relates to an apparatus for the generation and/or transmission and/or distribution and/or usage of electrical energy, said apparatus comprising a housing defining an insulating space and an electrical active part arranged in the insulating space. This insulating space comprises the insulation medium described above.

The term "electrical active part" in this application is to be interpreted broadly including any type of conductor, conductor arrangement, switch, conductive component, surge arrester, and the like, and furthermore shall be understood as any part, that can be activated electrically, i.e. can be subject to voltage, in at least one operating state, i.e. other temporally inactive operating states or locally inactive operating states of the part may still occur.

In particular, the apparatus of the present invention includes a switchgear, in particular an air-insulated or gas-insulated metal (or otherwise)-encapsulated switchgear) or a hybrid (i.e. partially air-insulated and partially gas-insulated) switchgear or a medium voltage block switchgear or a ring-main-unit, or a dead tank breaker or a PASS-module (plug-and-switch module), or a part and/or component thereof, in particular a bus bar, a bushing, a cable, a gas-insulated cable, a cable joint, a current transformer, a voltage transformer, and/or a surge arrester. Also possible is a gas insulated transmission line (GITL).

Switchgears, in particular gas-insulated switchgears (GIS), are as such well known to a person skilled in the art. An example of a switchgear for which the present invention is particularly well suited is for example shown in EP-A-1933432, paragraphs [0011] to [0015], the disclosure of which is incorporated herewith by reference.

It is further preferred that the apparatus is a switch, in particular an earthing switch (e.g. a fast acting earthing switch), a disconnector, a combined disconnector and earthing switch, a load-break switch or a circuit breaker, in particular a medium-voltage circuit breaker, a generator circuit breaker and/or a high-voltage circuit breaker. In particular, a high voltage circuit breaker may have a pressure-build-up chamber, e.g. a compression chamber and/or a heating chamber for providing a self-blasting effect, wherein in a switching operation the fluoroketone or fluoroketones is or are decomposed to fluorocarbon compounds having a lower number of carbon atoms, preferably in the pressure-build-up chamber and/or in the arcing region, during an arc-extinguishing phase. Such molecular decomposition of the fluoroketone admixture or admixtures may allow to further increase the number of molecules and hence the pressure which is available for extinguishing the arc. As well, molecular decomposition of the fluoroketone(s) also occurs in the arcing region, which further increases the arc-extinguishing blasting pressure. The fluoroketone admixture or admixtures is also helpful in the exhaust region of a circuit breaker, because the rather low dissociation temperature of the not-dissociated fluoroketones of about 400° C. to about 600° C. or even 900° C. functions as a temperature barrier in the exhaust gas. In other words, thermal energy in the exhaust gas can be absorbed by dissociation of undissociated fluoroketones in the exhaust, which prevents further temperature increase in the exhaust region above the dissociation temperature of the fluoroketones. Thus, the dielectric insulation of this application has a good arc extinction capability. Without any intention to be bound by the theory it is assumed that this arc extinction capability can at least partially be attributed to the recombination of the dissociation products of the fluoroketone inside the arcing region, for example mainly to tetrafluoromethane ($CF_4$) which is well known to be a highly potent arc extinction medium.

In particularly when used as an arc-extinction medium, the dielectric insulation medium according to the present invention comprises carbon dioxide and/or air or oxygen. As pointed out above, the presence of oxygen or air allows a reduction in the carbon deposition on the electrodes to be achieved, in particular when carbon dioxide is used as a further gas component.

Also, the amount of toxic arc by-products, which might in particularly be formed due to the decomposition of the fluoroketone and would then be present after the switching operation, can be reduced or avoided by the use of air or oxygen.

Preferably, the ratio of the molar fraction of oxygen to the molar fraction of the at least one fluoroketone a) and optionally c) is at least 2:1, more preferably at least 2.5:1, even more preferably at least 3:1.

According to a further preferred embodiment, the volume fraction of oxygen is at or below 40%, preferably below 30%, more preferably below 20%.

In particular when the dielectric insulation medium comprising a fluoroketone in mixture with carbon dioxide and/or air or oxygen is used as an arc-extinction medium, the ratio of the amount of carbon dioxide to the amount of air or oxygen is preferably 20:1 at most, more preferably 15:1 at most, even more preferably 10:1 at most, most preferably 5:1 at most. As mentioned above, the ratio of the molar fraction of oxygen to the molar fraction of fluoroketone a) and optionally further fluoroketone c) is preferably at least 2:1, more preferably at least 2.5:1, most preferably at least 3:1.

In embodiments, tetrafluoromethane (CF4) may also be used as the dielectric insulation gas component b) or as a dielectric insulation gas component element b1).

As mentioned, the present invention relates apart from the dielectric insulation medium and the uses described above also to an apparatus for the generation and/or transmission and/or distribution and/or usage of electrical energy, said apparatus comprising a housing defining an insulating space and an electrical active part arranged in the insulating space, said insulating space comprising an insulation medium, characterized by the dielectric insulation medium as defined above.

According to preferred embodiment, the apparatus is a switchgear, in particular an air-insulated or a gas-insulated metal-encapsulated switchgear or a hybrid switchgear or a medium voltage block switchgear or a ring-main-unit, or a dead tank breaker or a PASS-module (plug-and-switch module), or a part or component thereof, in particular a bus bar, a bushing, a cable, a gas-insulated cable, a cable joint, a current transformer, a voltage transformer, and/or a surge arrester.

According to a further preferred embodiment, the apparatus is a switch, in particular an earthing switch, a disconnector, a combined disconnector and earthing switch, a load-break switch and/or a circuit breaker.

As mentioned above, it is thereby particularly preferred that the apparatus is a high voltage circuit breaker having a pressure-build-up chamber for providing pressurized arc-extinguishing gas, in particular comprising a) the fluoroketone a) in a mixture with b1) carbon dioxide and/or b2) air or oxygen, and that in a switching operation the fluoroketone is decomposed to fluorocarbon compounds having a lower number of carbon atoms during an arc-extinguishing phase. As also mentioned above, the combined use of carbon dioxide with air or oxygen is particularly preferred due to the reduction in the carbon deposition on the electrodes and in the amount of toxic arc by-products, which is thereby achieved.

In analogy to the above, the particularly preferred arc-extinguishing gas can further contain a further fluoroketone c), in particular containing 6 carbon atoms, in addition to carbon dioxide and/or air or oxygen.

According to another embodiment, the apparatus can be a transformer, in particular a distribution transformer or a power transformer.

According to still other embodiments, the apparatus can also be, e.g., an electrical rotating machine, a generator, a motor, a drive, a semiconducting device, a power electronics device, and/or a component thereof.

The invention particularly relates to a medium or high voltage apparatus. The term "medium voltage" as used herein refers to a voltage in the range of 1 kV to 72 kV, whereas the term "high voltage" refers to a voltage of more than 72 kV. Applications in the low voltage range below 1 kV are feasible, as well.

In order to achieve a desired dielectric rating of the apparatus, such as a required dielectric withstand capability and operating temperature range, the apparatus can comprise a control unit (also referred to as "fluid management system") for controlling individually or in combination: the composition—in particular the chemical composition or the physical phase composition, such as a gas/liquid two-phase system-, and/or the temperature of the insulation medium, and/or the absolute filling pressure, the gas density, the partial pressure and/or the partial gas density of the insulation medium or of at least one of its components, respectively. In particular, the control unit can comprise a heater and/or vaporizer in order to control the vapour pressure of the insulation medium components according to the invention, which is of particular relevance for applications in a low temperature environment down to about −20° C. The vaporizer can e.g. be an ultrasonic vaporizer, or can comprise spraying nozzles for spraying the insulation medium into the apparatus.

In an exemplary embodiment, in particular for high voltage applications in a low temperature environment, a partial pressure of the fluoroketone(s), in particular fluoroketone a) and/or c), can be provided in the insulation medium by heating and/or vaporizing, such that the partial pressure of the fluoroketone is maintained at a desired pressure level.

If a vaporizer is used, it should also comprise a dosing unit to set the concentration of the fluoroketone(s), in particular fluoroketone a) and/or c), in the insulation medium according to the needs of the dielectric insulation capability or dielectric strength. The term "dielectric insulation capability" or "dielectric strength" in this application shall be understood broadly and may include more specific characterization by an electric breakdown field strength which may be determined under specific measurement conditions. This will exemplarily be shown in more detail below for a medium or high voltage gas-insulated switchgear. Furthermore, the control unit may comprise a measuring unit for measuring the control parameters, such as temperature, density, pressures and/or composition—in particular the liquid phase level—and/or a monitoring unit for monitoring such parameters.

According to a further aspect, the present invention also relates to a method for dimensioning an electrical apparatus, the dimensioning method being characterized by the steps of
a) selecting an apparatus having a rating characterized by rating parameters, which comprise an electric field strength $E_{app}$ required in a space to be filled by the dielectric insulation medium, a minimal rated operating temperature $T_{min}$, a maximal rated operating temperature $T_{max}$, and a maximal permissible gas pressure $p_{max}$;
b) selecting a dielectric insulation gas comprising a fluoroketone in a mixture with a dielectric insulation gas component b) different from said fluoroketone, with the mixture having a non-linearly increased dielectric strength characterized by a synergy factor s,
c) the dielectric insulation gas, in particular the mixture, having characteristic parameters being defined by the type, partial pressure $p_a$, or in particular corresponding number density or volume concentration or molar fraction $m_a$, and pressure-reduced electric breakdown field strength $E_{crit,a}$ of the fluoroketone, and the type, partial pressure $p_b$, or in particular corresponding number density or volume concentration or molar fraction $m_b$, and pressure-reduced electric breakdown field strength $E_{crit,b}$ of the gas component b),
d) calculating a linear pressure-reduced breakdown field strength $Ebd_{lin.calc.}$ of the dielectric insulation gas, in particular the mixture, as a function of the partial pressure $p_a$ of the fluoroketone by a partial-pressure-weighted sum of the pressure-reduced electric breakdown field strengths $E_{crit,a}$ and $E_{crit,b}$,
e) determining from the electric field strength $E_{app}$ and from the linear pressure-reduced breakdown field strength $Ebd_{lin.calc.}$ an absolute pressure curve $p_{abs}(p_a)$ of the dielectric insulation gas as a function of the partial pressure $p_a$ of the fluoroketone,
f) selecting an absolute filling pressure $p_{abs}$ of the insulation gas at a standard temperature and determining therefrom and from the absolute pressure curve $p_{abs}(p_a)$ a first partial pressure $p_{a1}$, or in particular a first corresponding number density or molar fraction $m_{a1}$, of the fluoroketone, and
g) extending at least one of the rating parameters of the electric apparatus due to the synergy factor of the mixture being larger than 1.

As it is generally preferred that no liquefaction of the fluoroketone occurs, the method further comprises the steps of:
a) determining a second partial pressure $p_{a2}$, or in particular a second corresponding number density, of the fluoroketone such that a condensation temperature of the fluoroketone in the insulation gas is below the minimal rated operating temperature $T_{min}$, and
b) if the first partial pressure $p_{a1}$ is equal to or lower than the second partial pressure $p_{a2}$, then selecting the partial pressure $p_a$ of the fluoroketone in a range such that $p_{a1} \leq p_a \leq p_{a2}$, or
c) if the first partial pressure $p_{a1}$ is larger than the second partial pressure $p_{a2}$, then:
   i. selecting the partial pressure $p_a$ of the fluoroketone smaller than or equal to the second partial pressure $p_{a2}$ and increasing the absolute pressure $p_{abs}$, in particular increasing the absolute pressure $p_{abs}$ equal to $p_{abs}(p_{a2})$, by increasing the partial pressure $p_b$ of the dielectric insulation gas component b), and/or
   ii. increasing the minimal or minimal rated operating temperature $T_{min}$ by heating and thereby increasing the second partial pressure $p_{a2}$ to a higher value, and in particular increasing the second partial pressure $p_{a2}$ to a value equal to or above the first partial pressure $p_{a1}$ and then selecting the partial pressure $p_a$ of the fluoroketone in a range such that $p_{a1} \leq p_a \leq p_{a2}$.

Please note that the absolute pressure curve $p_{abs}(p_a)$ is an increasing function with decreasing fluoroketone partial pressure, because and as long as the pressure-reduced electric breakdown field strength is larger for fluoroketone than for the dielectric insulation component b).

If in addition to fluoroketone a) a further fluoroketone c) is used, the method shall be performed analogously with the additional step that the partial pressures of both fluoroketones shall be calculated to ensure that both fluoroketones remain in the gaseous phase at least down to $T_{min}$ of the apparatus.

In exemplary embodiments, the method further comprises the steps of:
a) determining a value of the synergy factor s for the mixture, in particular for a ratio of the partial pressure $p_a$ of the fluoroketone to the partial pressure $p_b$ of the dielectric gas component b), and
b) performing a rating extension by at least one of the following steps: increasing the electric field strength $E_{app}$, decreasing the minimal rated operating temperature $T_{min}$, decreasing the absolute filling pressure $p_{abs}$, reducing the partial pressure $p_a$ or molar fraction $m_a$ of the fluoroketone, increasing a safety margin, and combinations thereof.

In the above, the maximal electric field strength $E_{app}$ may be defined to comprise a safety margin. The absolute filling pressure shall be selected below the maximal permissible gas pressure $p_{max}$. Furthermore, the fluoroketone may preferably be a fluoroketone a) containing exactly 5 carbon atoms and/or it may be a fluoroketone containing exactly 6 carbon atoms. Preferably, the dielectric gas component b) may comprise at least one of: air, nitrogen, carbon dioxide, and mixtures thereof.

Furthermore, the above dimensioning method steps are also characterizing features of the electrical apparatus itself, the corresponding claims being herewith recited as part of this description.

BRIEF DESCRIPTION OF THE DRAWINGS

The invention is further illustrated by way of the following figures of which

DETAILED DESCRIPTION OF THE INVENTION

Figure 1:
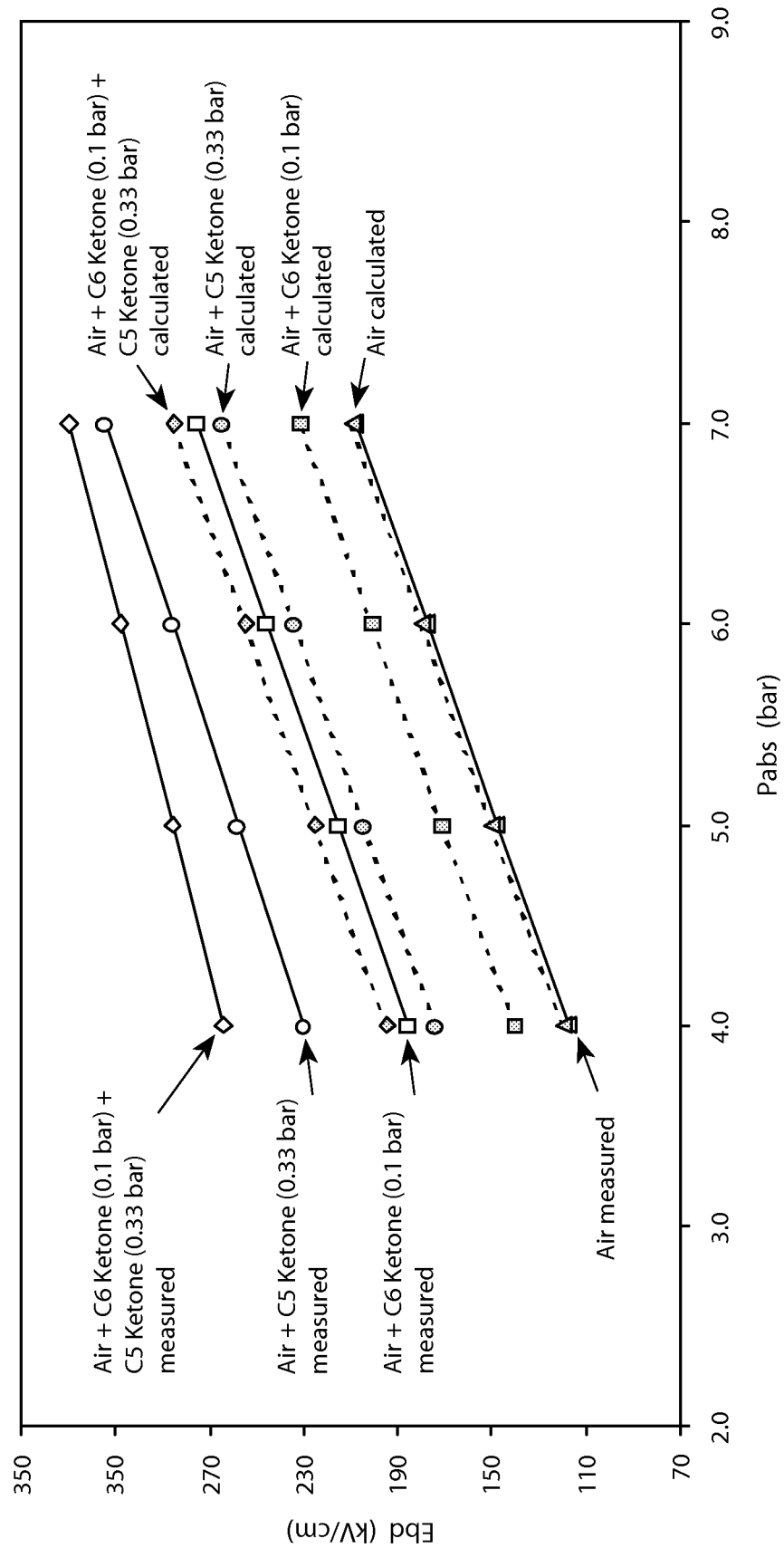
FIG. 1 shows a graphical representation of the measured and calculated breakdown voltages of air and dielectric insulation gas mixtures according to embodiments of the present invention as a function of the total absolute filling pressure of the system.

In the following, exemplary embodiments of the invention are discussed:

The electric field strengths of the pure gases required as input for the calculation of the graphical representation of the breakdown fields of several gas mixtures given in FIG. 1 have been determined by performing dielectric tests using a test device which provides representative field conditions, and in particular exemplarily homogenous field conditions. The calculated values are given in dotted lines.

According to FIG. 1, the breakdown voltage obtained by adding about 100 mbar, more precisely 96 mbar, of the C6-ketone to air (mixture I) is calculated to be increased by about 10% to 15% compared to pure air (and is at 4.0 bars about 140 kV/cm); the breakdown voltage obtained by adding about 350 mbar, more precisely 325 mbar, of the C5-ketone to air (mixture II) is calculated to be increased by about 30% to 40% compared to pure air (and is at 4.0 bars about 170 kV/cm), and the breakdown voltage obtained by adding about 100 mbar of the C6-Ketone and about 350 mbar of the C5-ketone to air (mixture III) is calculated to be increased by about 40% to 50% compared to pure air (and is at 4.0 bars about 190 kV/cm).

However, for the insulation media according to embodiments of the present invention, in particular for gas mixture II, the measured breakdown voltage values are much higher than the calculated values, as is represented in FIG. 1 by the continuous lines. This proves that a strong non-linear interaction between the C5-ketone and air or similar gas is present, which strongly improves the dielectric insulation capability, here represented by the electrical breakdown field strengths Ebd in kV/cm, of the gas mixture over the arithmetic sum of the dielectric insulation capabilities, here represented by the electrical field strengths Ebd in kV/cm, of the individual gas mixture components. Similar results have been found for mixture I.

Specifically, the measured breakdown field obtained for gas mixture II is about 60% to 80% higher than the breakdown field of pure air (and is at 4.0 bars about 230 kV/cm), and the measured breakdown field obtained for gas mixture III is about 75% to 95% higher than the breakdown field of pure air (and is at 4.0 bars about 260 kV/cm). These improvements are thus considerably higher than the ones expected from linearly adding the breakdown fields of the gas mixture components, which would result in dielectric breakdown fields increased only by 30% to 40% for gas mixture II and by 40% to 50% for gas mixture III compared to pure air.

Also, the measured breakdown field obtained for gas mixture I is about 30% to 50% higher than the breakdown field of pure air (and is at 4.0 bar about 180 kV/cm), which is higher than the expected improvements of 10% to 15% for gas mixture I compared to pure air.

The breakdown field values according to FIG. 1 have been measured performing a standard negative polarity lightning impulse dielectric test using a test device with a homogeneous field arrangement.

Positive polarity standard lightning impulse dielectric tests and AC dielectric tests have been performed with similar gas mixtures as I, II and III, under different combinations of field arrangements, filling pressures and contact distances yielding similar results affirming the synergistic effect between the C5-ketone and the C6-ketone with air and other gases such as $CO_2$.

Figure 2:
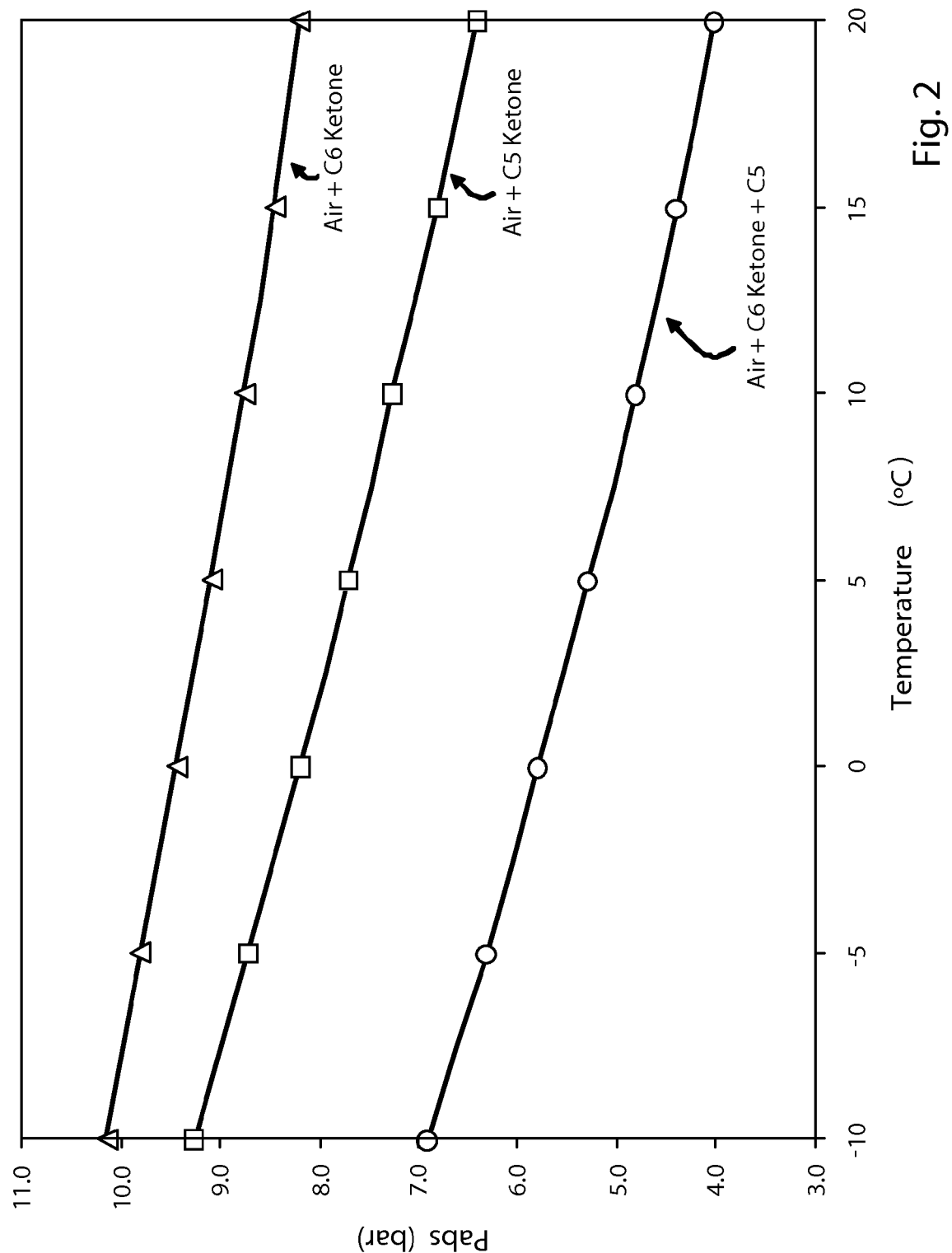
FIG. 2 is a graphical representation of the filling pressure needed for reaching the same insulation performance as SF6 at 4.5 bar, when using a fluoroketone comprising 5 carbon atoms in air, a fluoroketone comprising 6 carbon atoms in air, and a fluoroketone comprising 5 carbon atoms and a fluoroketone comprising 6 carbon atoms in air as an insulation medium.

FIG. 2 shows the filling pressure needed for gas mixtures I, II and III, respectively, for reaching the same insulation performance as $SF_6$ at 4.5 bar. FIG. 2 shows the required filling pressure for different mixtures as a function of temperature. FIG. 2 can therefore be read to determine the dielectric insulation medium for operation without liquefaction by: in a first step determining the minimal operating temperature of the dielectric insulation medium or the electric apparatus, respectively; in a second step determining the vapour pressure of each fluoroketone component in the mixture that guarantees no liquefaction of the fluoroketone(s) at the minimal operating temperature; in a third step reading from FIG. 2 the total gas pressure needed to achieve the same or similar insulation performance like $SF_6$ at 4.5 bars; and in a fourth step adding the carrier gas, here air or air components, in such an amount, that the sum of the fluoroketone partial pressures and the carrier gas pressure reach the total gas pressure. FIG. 2 furthermore proves that the desired insulation performance, corresponding to 4.5 bars of pure $SF_6$, at −5° C. is achievable with an insulation medium comprising air, C5-ketone and C6-ketone at a filling pressure of about 6.5 bars. Such a filling pressure is in a usual pressure range of today's gas-insulated switchgear apparatuses or of a part and/or component thereof. At a minimal permissible operating temperature of, for example, −5° C., said insulation medium thus allows to achieve insulation capabilities similar to the one of $SF_6$ at 4.5 bar without requiring any modification of conventional electrical apparatuses, in particular of enclosures or housings, to withstand such pressures that are not higher than conventional filling pressures. For electrical equipment, such as high-voltage switchgears or a part and/or component thereof, an ecologically highly attractive and yet insulation-performance-wise equivalent substitute for conventional high-performance insulation media can thus be provided by setting the filling pressure of a gas mixture comprising air and 5-carbon fluoroketone and optionally 6-carbon fluoroketone to about 6.5 bar.

Apart from the specific dielectric insulation medium, the present invention also relates an electrical apparatus, as mentioned above. Preferably, the apparatus comprises a control unit (or "fluid management system") in order to adapt the pressure, the composition and/or the temperature of the insulation medium. This is of particular relevance for applications in an environment of a temperature as low as −20° C.

Figure 3:
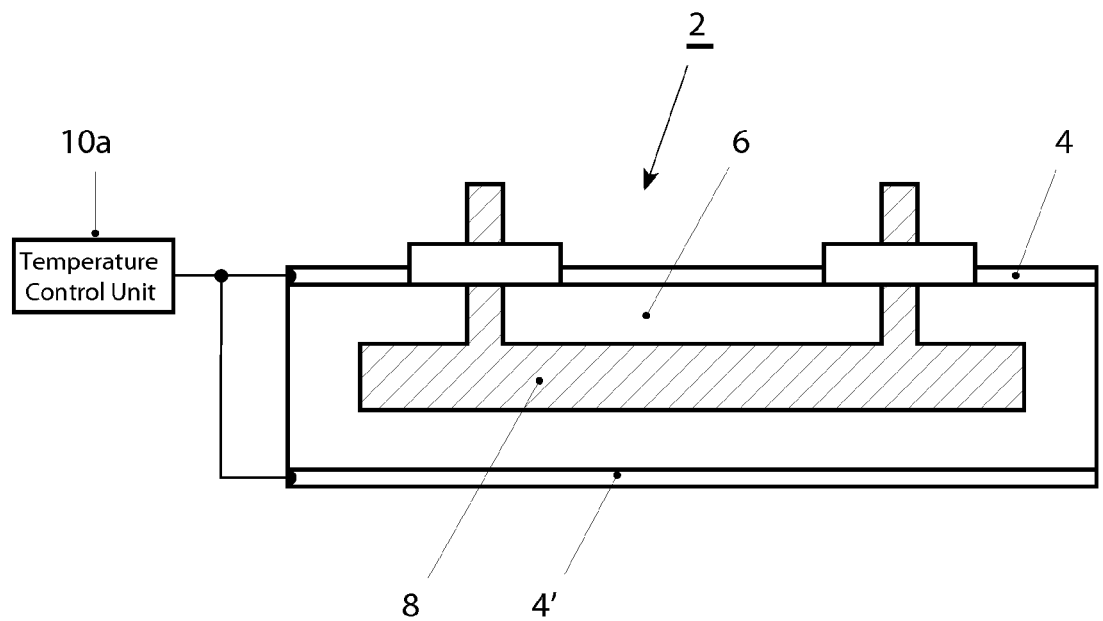
FIG. 3 shows a purely schematic representation of a high voltage gas-insulated switchgear according to an embodiment comprising a temperature control unit.
Figure 4:
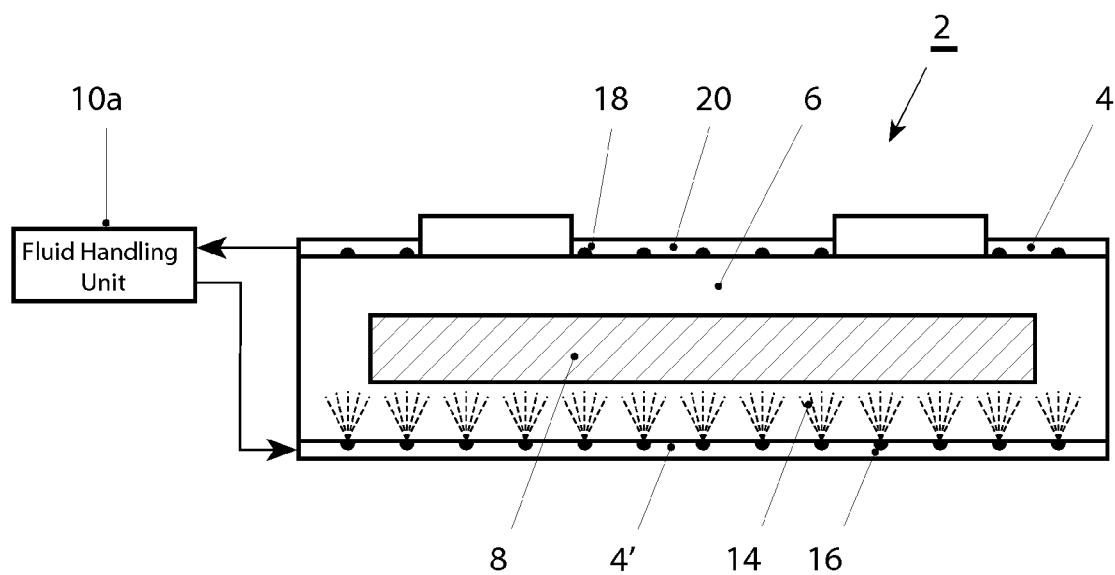
FIG. 4 shows a purely schematic representation of a high voltage gas-insulated switchgear according to an embodiment comprising a fluid handling unit.

As an example, a high voltage switchgear comprising a temperature control unit is shown in FIG. 3. The switchgear 2 comprises a housing 4 defining an insulating space 6 and an electrical active part 8 arranged inside the insulating space 6. The switchgear 2 further comprises a temperature control unit 10a for setting the housing 4, or at least a part of the housing 4, of the switchgear 2 and thus the insulation medium comprised in the insulating space 6 to a desired temperature or minimal (or minimal rated) operating temperature $T_{min}$. Of course, any other part in contact with the insulation medium can be heated in order to bring the insulation medium to the desired temperature. Thus, the vapour pressure of the fluoroketone—and consequently its partial pressure $p_a$ or molar ratio $m_a$ in the insulation gas—as well as the absolute pressure $p_{abs}$ of the insulation gas can be adapted accordingly. As is also shown in FIG. 4, the fluoroketone is in this embodiment not homogenously distributed throughout the insulating space due to the temperature gradient given in the insulation space 6. The concentration of the fluoroketone is thus higher in close proximity to the walls 4' of the housing 4.

An alternative control unit or fluid management system is schematically shown in FIG. 4, in which a fluid handling unit 10b is attributed to the gas-insulated switchgear 2 as the control unit. According to this control unit 10b, the composition of the insulation medium, and in particular its concentration of the fluoroketone, in particular fluoroketone a) and/or fluoroketone c), is adjusted in a dosing unit comprised in the fluid handling unit 10b, and the resulting insulation medium is injected or introduced, in particular sprayed, into the insulating space 6. In the embodiment shown in FIG. 4, the insulation medium is sprayed into the insulating space in the form of an aerosol 14 in which small droplets of liquid fluoroketone are dispersed in the respective carrier gas. The aerosol 14 is sprayed into the insulating space 6 by means of nozzles 16 and the fluoroketone is readily evaporated, thus resulting in an insulating space 6 with an inhomogeneous concentration of fluoroketone, specifically a relatively high concentration in close proximity to the housing wall 4' comprising the nozzles 16. Alternatively, the insulation medium, in particular a concentration, pressure and/or temperature of the fluoroketone a) and/or dielectric insulation gas b) and/or fluoroketone c), can be controlled in the fluid handling unit 10b before being injected into the insulation space. In order to ensure circulation of the gas, further openings 18 are provided in the upper wall of the housing 4, said openings leading to a channel 20 in the housing 4 and allowing the insulation medium to be removed from the insulating space 6. The switchgear 2 with fluid handling unit 10b, as shown in FIG. 4, can be combined with the temperature control unit 10a described in connection with FIG. 4. If no temperature control unit is provided, condensation of the fluoroketone can occur. The condensed fluoroketone can be collected—if needed filtered—and reintroduced into the circulation of the insulation medium. Furthermore, the apparatus 2 can have a reserve volume of liquid fluoroketone, in particular fluoroketone a) (or C5-ketone) and/or fluoroketone c) (or C6-ketone), and/or means for limiting a maximal permissible operating temperature of the desired insulation medium such that the absolute filling pressure is maintained below a given pressure limit of the apparatus 2.

In the context of the switchgears 2 shown in FIG. 3 and FIG. 4 it is noted that nominal current load generally facilitates the vaporization of the fluoroketone, in particular fluoroketone a) (or C5-ketone) and/or fluoroketone c) (or C6-ketone), by the ohmic heating of current-carrying conductors. Thus, the use of the temperature control unit is normally only required when the equipment or apparatus (carrying nominal current) does not provide the required temperature for the desired partial pressure of the fluoroketone(s), e.g. at a very low ambient temperature.

According to the embodiments given above, the term "dielectric insulation medium" in this application shall be understood broadly to encompass a gaseous phase and possibly a liquid phase of the dielectric insulation medium. However, preferably the dielectric insulation medium, i.e. all components of the dielectric insulation medium, shall be present fully and exclusively in gaseous state under all operating conditions, in particular under all operating temperatures of the electrical apparatus. Furthermore, this term shall encompass a medium that has outstanding dielectric insulation capability or dielectric strength, for example in gas-insulated switchgear (GIS) or gas-insulated transmission lines (GITL), and/or has high performance for extinguishing electric arcs, for example arc faults in GIS or GITL or switching arcs in any sort of switch, disconnector, circuit breaker or the like.

Various dielectric tests have been performed to prove the exceptionally high and nonlinearly increased dielectric strength of the dielectric insulation medium according to this invention. In particular, a dielectric medium comprising a mixture of a fluoroketone containing exactly 5 carbon atoms and a fluoroketone containing exactly 6 carbon atoms and air, in particular C5-fluoroketone, C6-fluoroketone and technical air, here briefly called FCK-air mixture, was used in dielectric test performed in a conventional disconnector of a gas-insulated switchgear (GIS).

Figure 5:
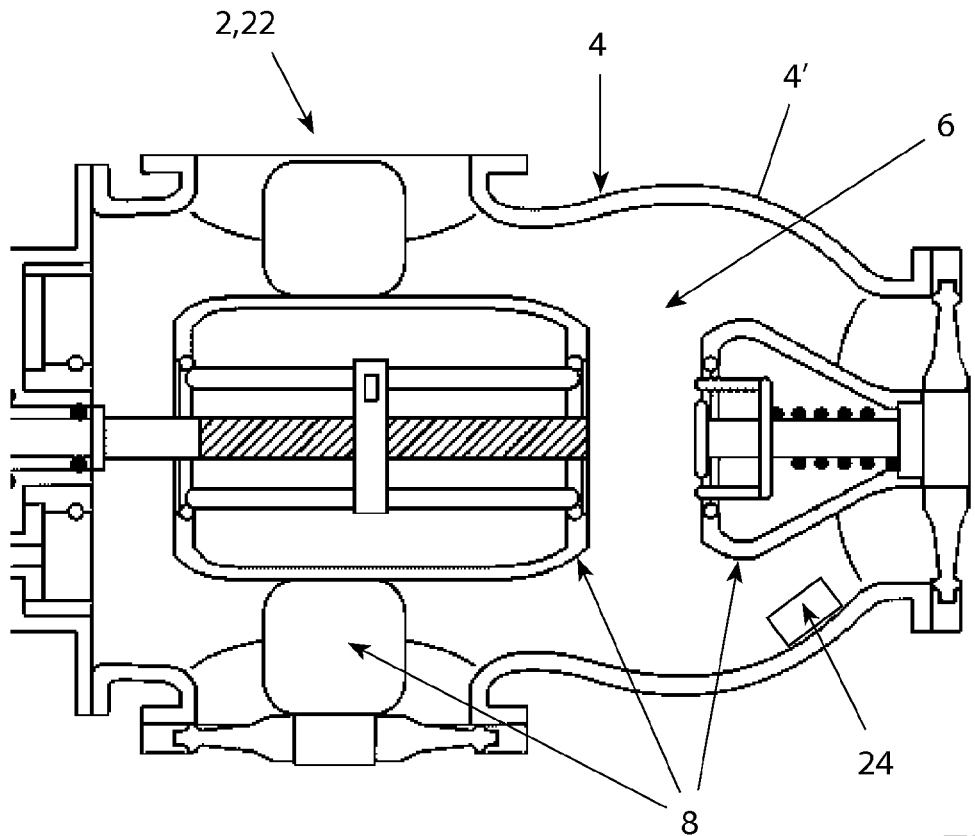
FIG. 5 shows a conventional disconnector filled with an exemplary embodiment of the dielectric insulation medium.

FIG. 5 shows an embodiment of the switchgear 2, here exemplarily a combined disconnector and earthing switch 22, having again a housing 4, a housing wall 4' encapsulating an insulating space 6 filled with the above mentioned gas mixture FCK-air and the active parts 8. A gas sensor 24 can be present, as well. The disconnector 22 was in a first step evacuated; in a second step C6-fluoroketone was filled into the disconnector 22 up to a pressure of approximately 100 mbar; in a third step C5-fluoroketone was additionally filled into the disconnector 22 up to a total pressure of approximately 460 mbar, i.e. with a partial pressure of C5-fluoroketone of 360 mbar; and in a fourth step, technical air was filled in up to a total absolute pressure of 7 bars. This mixture is here briefly called FCK-air. Preferably, the gas sensor 24, for example the gas density sensor 24 or gas pressure sensor 24, is present and allows to control the filling pressures and/or partial gas pressures in the dielectric insulation medium. The order of at least the second and third filling step can in principle be exchanged.

The disconnector 22 is a standard part (ELK-TK14) designed for 300 kV rated voltage, 1050 kV lightning impulse voltage, and 460 kV power frequency withstand voltage, according to IEC standards 62271-203 and 62271-1, with $SF_6$ filling pressure of 4.5 bars absolute at 20° C.

Dielectric tests done with this disconnector 22 filled with the above mentioned 7 bars FCK-air mixture proved to withstand dielectric tests according to IEC standard for 300 kV rated voltage. All dielectric tests have been carried out also according to IEC 60060-1 (High Voltage Test Techniques), which further regulates test conditions and test procedures.

The disconnector 22 with 7 bars FCK-air has passed successfully without flashovers the short-duration power-frequency withstand voltage test for 460 kV rms phase-to-earth, the short-duration power-frequency withstand voltage test for 595 kV rms across isolating distance, i.e. across open contacts of the disconnector 22, and the lightning impulse withstand voltage test for 1050 kV peak voltage. This proves further, that the FCK-air mixture containing the fluoroketone with exactly 5 carbon atoms shows an exceptionally high dielectric strength or dielectric withstand voltages also in inhomogeneous electric field arrangements, for example in the electric field distribution present in the disconnector 22 (ELK-TK14).

Figure 6:
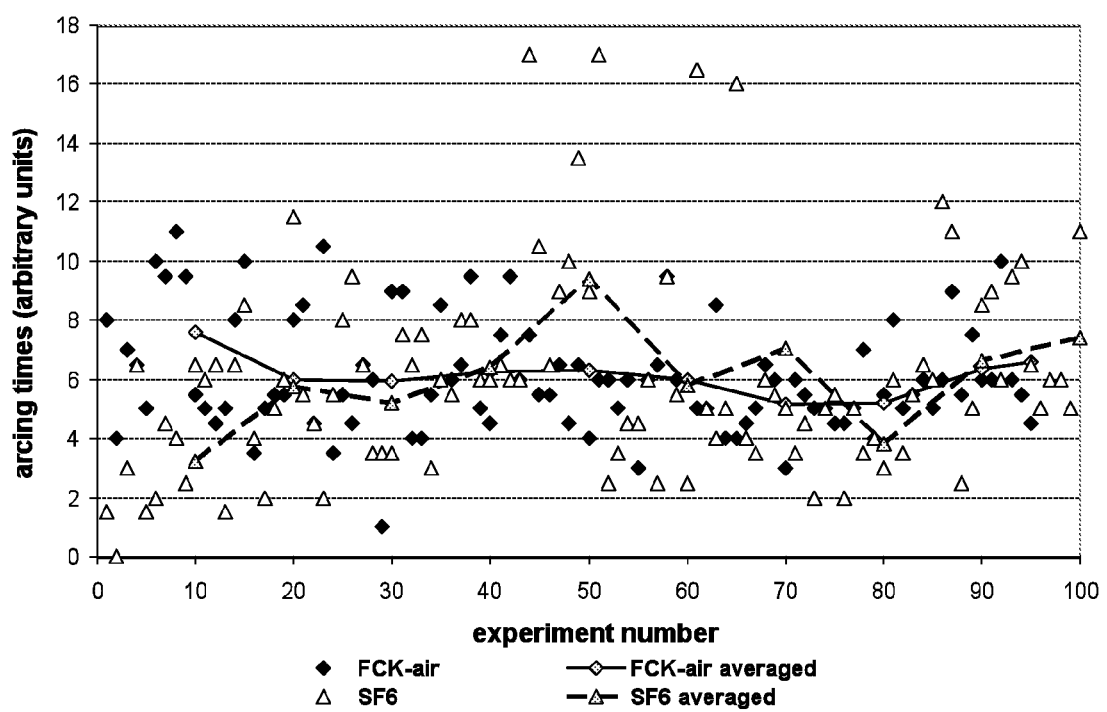
FIG. 6 shows arcing times (a. u.) in a bus transfer current switching test using the conventional disconnector filled with the exemplary embodiment of the dielectric insulation medium (diamonds) and filled with a conventional insulation medium (triangles)

FIG. 6 shows arcing times in arbitrary units in a bus transfer current switching test according to IEC 62271-102 performed in the disconnector 22 filled with 7 bars of the above mixture FCK-air (diamonds). Standard test conditions according to IEC 62271-102 have been applied, in particular 1600 A bus transfer current at 20 V bus transfer voltage were applied. Test results with conventional $SF_6$ dielectric insulation gas at 4.5 bars absolute pressure are shown for comparison (triangles). For better visual comparison, averages of 10 measurement points have been taken and shown as continuous line for FCK-air and as dashed line for $SF_6$. FIG. 6 proves that the new dielectric insulation medium FCK-air has at least the same bus transfer current switching performance as conventionally used $SF_6$. Furthermore, FIG. 6 proves that the new dielectric insulation medium comprising FCK-air at 7 bars absolute pressure has an excellent arc extinction capability, in particular here in the context of bus transfer current switching, which is comparable to or even better than that of $SF_6$ at 4.5 bars absolute pressure.

After having performed the 100 bus transfer current switching operations, dielectric insulation capability has been confirmed by performing dielectric condition check according to IEC 62271-203.

Figure 7A:
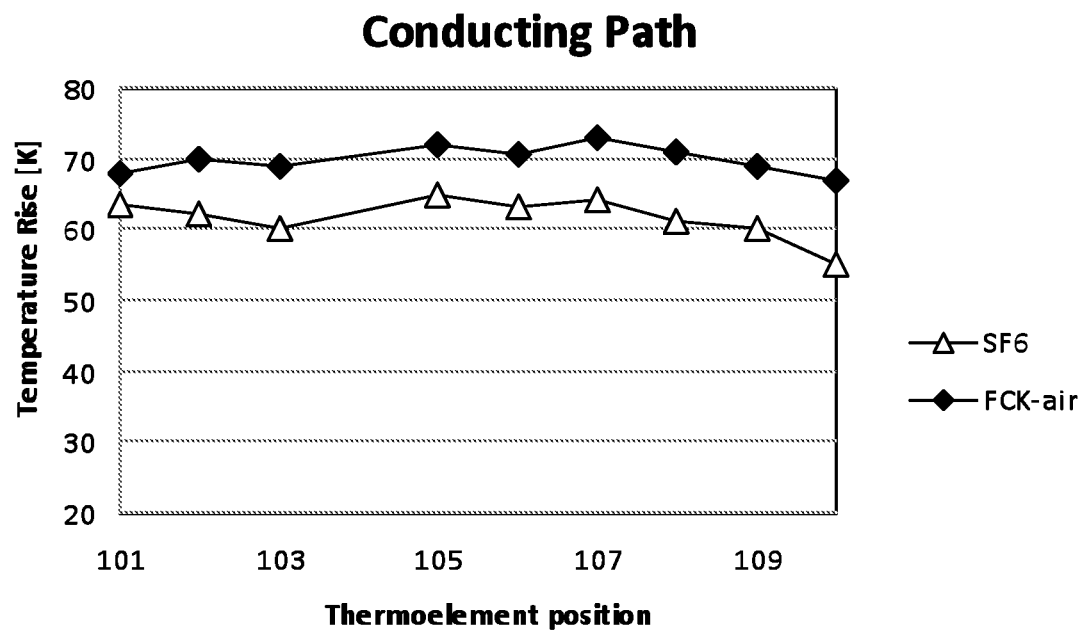
FIG. 7*a*, 7*b* show results of temperature rise tests in a section of a bus bar filled with an exemplary insulation medium (diamonds) and filled with a conventional insulation medium (triangles)
Figure 7B:
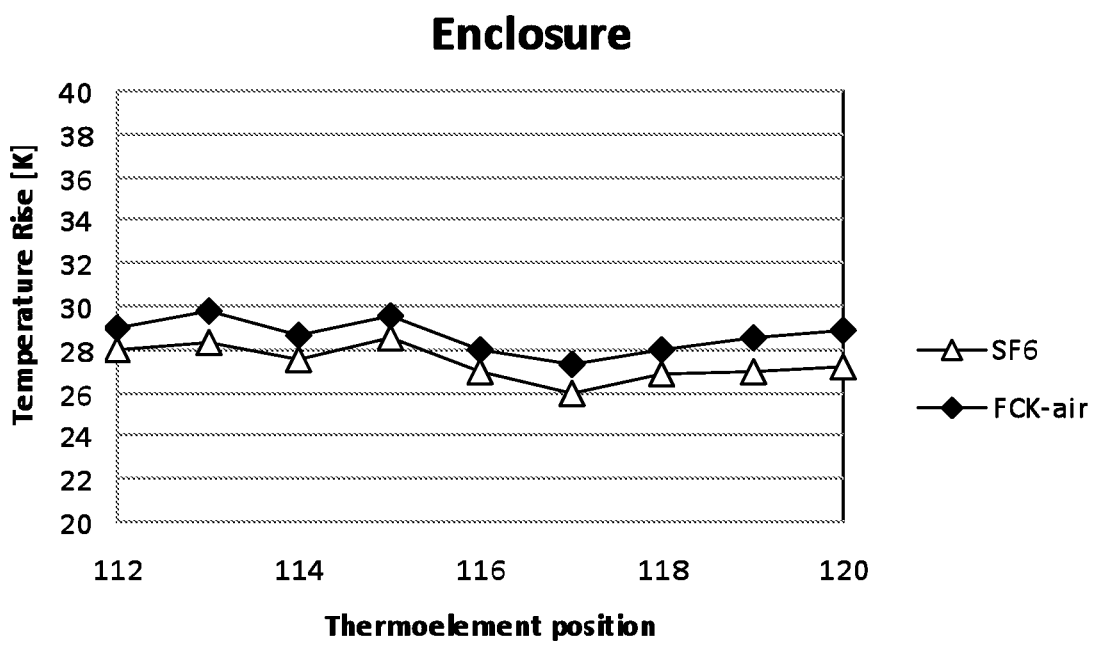

FIG. 7a, 7b show results of temperature rise tests in a section of a bus bar filled with an exemplary insulation medium (diamonds), here C5-fluoroketone at 360 mbar partial pressure plus C6-fluoroketone at 100 mbar partial pressure plus approximately 4.0 bars technical air; and for comparison filled with a conventional insulation medium (triangles), here SF6 at 4.5 bars absolute pressure. The temperature rise tests were performed at approximately 20° C. ambient temperature. Tests were performed according to IEC 62271-203 and IEC 62271-1.

FIG. 7a, 7b show the temperature rise over ambient temperature of the active parts (top FIG. 7a) and of the enclosure (bottom FIG. 7b) as a function of the thermo element locations. FIG. 7a, 7b prove that the thermal performance or heat transfer capability of the FCK-air mixture is comparable to the heat transfer capability of conventional $SF_6$. For FCK-air mixture at higher nominal absolute pressure, for example at 7 bars total absolute pressure, an even higher heat transfer capability can be expected.

In exemplary embodiments, the dielectric insulation medium shall contain the fluoroketone comprising exactly 5 carbon atoms in liquid phase in a form different from a bulk liquid at least in the insulation space 6, for example in form of liquid droplets, aerosols, mist, or spray in the insulation space 6. Such embodiments may include the dielectric insulation medium with fluoroketone comprising exactly 5 carbon atoms to be in bulk liquid form outside the insulation space 6 of an electrical apparatus 2 e.g. having a fluid management system 10a, 10b.

In exemplary embodiments, any fluoroketone containing exactly 5 carbon atoms for other purposes than as dielectric insulation medium shall be disclaimed from the subject-matter of this application, in particular from the subject-matter claimed in any independent claim and/or in any dependent claim or claim combination, in particular from the claimed dielectric insulation medium, the claimed use of the dielectric insulation medium, and from the claimed apparatus comprising the dielectric insulation medium. For example, it shall be disclaimed from the subject-matter of this application, in particular from any claim or claim combination:

any fluoroketone containing exactly 5 carbon atoms for a method for treating molten reactive metal, in particular to protect said reactive metal from reacting with oxygen or with air; and/or any fluoroketone containing exactly 5 carbon atoms as a cleaning agent, in particular for cleaning a vapour reactor or electronic systems; and/or any fluoroketone containing exactly 5 carbon atoms as fire extinction medium or for use in fire extinction systems; and/or any fluoroketone containing exactly 5 carbon atoms as coolant in liquid form, in particular for cooling of electronic systems; and/or any fluoroketone containing exactly 5 carbon atoms for the Rankine-process, in particular in small power plants; and/or any fluoroketone containing exactly 5 carbon atoms as a lubricant; and/or any fluoroketone containing exactly 5 carbon atoms as a liquid: for example as a liquid in an electrical apparatus or in a transformer, as a liquid coolant, as a liquid coolant in an electrical apparatus, as a liquid coolant in a transformer, and/or as a liquid for hydraulic systems or liquid coupled mechanical drives; and/or any fluoroketone containing exactly 5 carbon atoms selected from the group consisting of chlorodifluoromethyl perfluoroisopropyl ketone and difluoromethyl perfluoroisopropyl ketone; and/or any dielectric insulation medium comprising, besides fluoroketone a), a fluoroketone selected from the group consisting of β-chloroperfluoroethyl perfluoroisopropyl ketone, difluoromethyl perfluoro-t-butylketone and dodecafluoro-2-methyl-pentan-3-one.

In exemplary embodiments, the dielectric insulation medium of this invention or its use or the electrical apparatus of this invention, in particular as claimed in any independent claim and/or in any dependent claim or claim combination, shall not be a dielectric insulation medium for a transformer, or shall not be a transformer, for example not a distribution transformer, not a power transformer, in other examples not a gas transformer, not a liquid transformer, not a dry transformer, and/or not any combination of a gas transformer, liquid transformer and dry transformer.

In further exemplary embodiments, the dielectric insulation medium of this invention, in particular as claimed in any independent claim and/or in any dependent claim or claim combination, shall not be a working medium for a heat pipe, in particular not a working medium for a heat pipe in a transformer.

Figure 8:
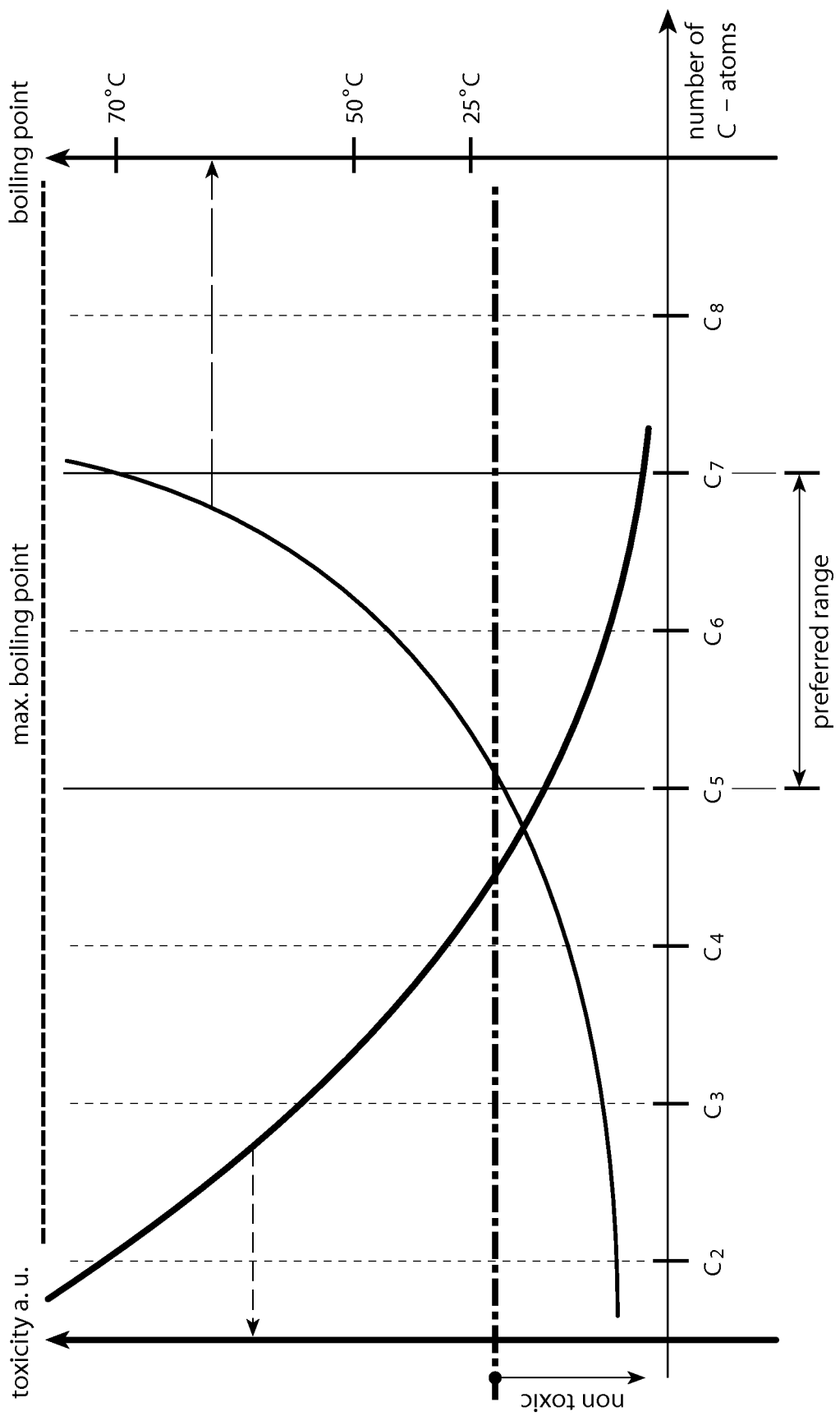
FIG. 8 shows a schematic diagram of toxicity (a.u., left-hand side) and boiling point (right-hand side) as a function of number of carbon atoms contained in the fluoroketone.

In one particular embodiment, the dielectric insulation medium according to this invention, in particular as claimed in any independent claim and/or in any dependent claim or claim combination, does not contain fluoroketone containing exactly 6 carbon atoms, in particular does not contain dodecafluoro-2-methylpentan-3-one $(CF_3CF_2C(O)CF(CF_3)_2)$ with tradename Novec 1230 from 3M. Such embodiments may profit from the advantage of lower boiling points of fluoroketones having exactly 5 carbon atoms only. FIG. 8 shows a schematic diagram of toxicity (on left-hand side) in arbitrary units and of boiling point or boiling point temperature $T_p$ (on right-hand side) as a function of the number of carbon atoms contained in the fluoroketone, in particular in fluoroketone a) and/or fluoroketone c). A maximal permissible toxicity level is indicated by the horizontal dashed bold line, and a maximal permissible level of boiling point is indicated by the horizontal dashed thin line. As a general rule, toxicity decreases with increasing number of carbon atoms such that fluoroketones having 5 or more carbon atoms are permissible due to being sufficiently non-toxic. As a further general rule, the boiling point is increasing with increasing number of carbon atoms such that fluoroketones having 7 or less carbon atoms are useful in typical technical applications, whereas fluoroketones having 8 or more carbon atoms are considered to be less useful or not useful due to too high boiling points. Therefore, in view of non-toxicity and low boiling point, fluoroketones having from 5 to 7 carbon atoms are preferred.

Figure 9:
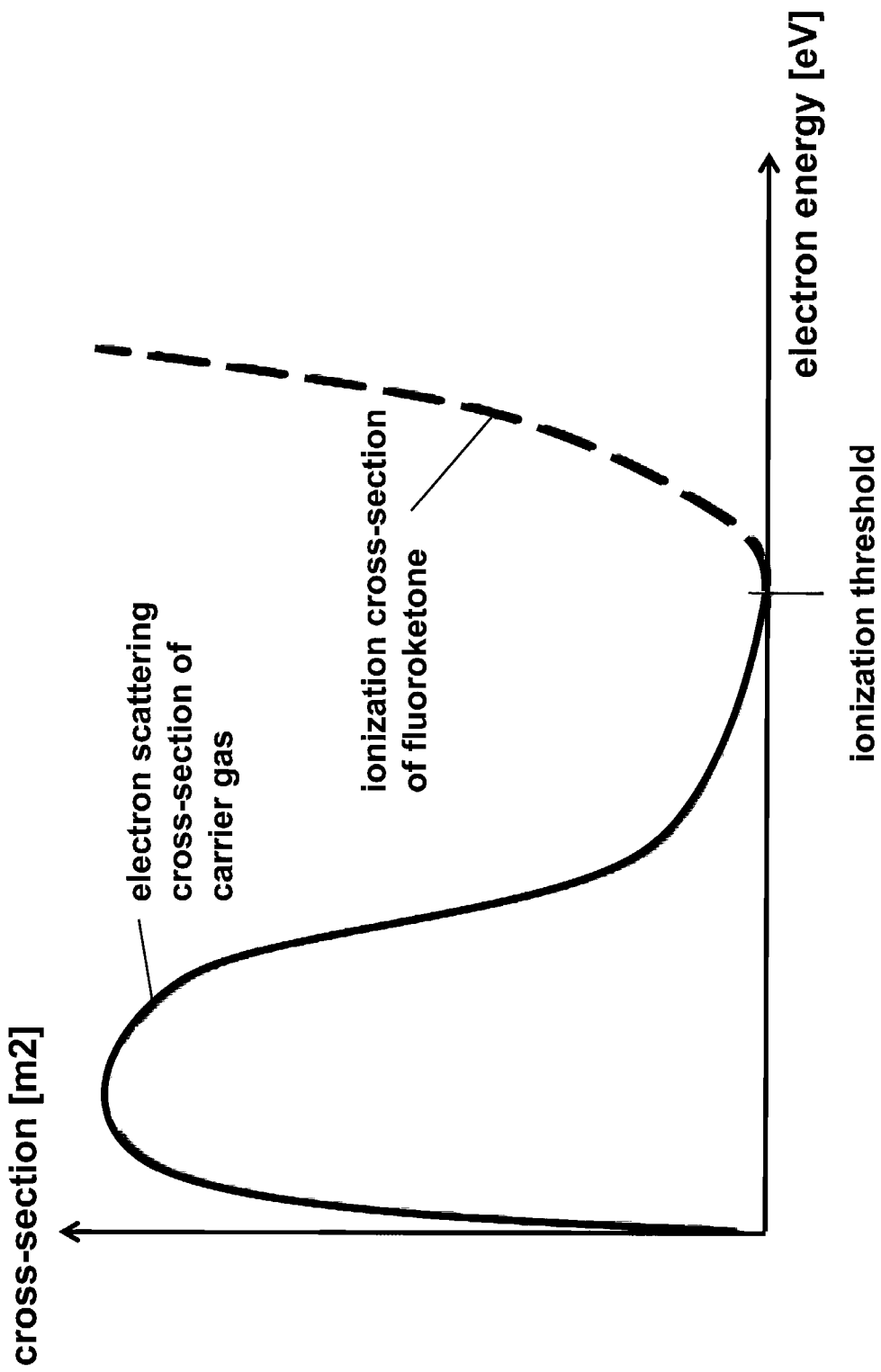
FIG. 9 shows a schematic diagram of cross-sections for electron scattering in the carrier gas and for ionization in the fluoroketone as a function of electron energy.

FIG. 9 shows a schematic diagram of cross-sections (measured e.g. in $m^2$) for electron scattering in the carrier gas, in particular in the dielectric insulation gas component b), and for ionization in the fluoroketone, in particular in the fluoroketone a) and/or fluoroketone c), as a function of electron energy (measured e.g. in eV).

Without being bound to theory: a possible mechanism of the nonlinearly increased dielectric strength according to this invention can be that the dielectric gas component b) (which is or comprises the carrier gas) serves for decelerating electrons, which stem from dielectric breakdown, and the fluoroketone a), and possibly fluoroketone c), serves for capturing such decelerated electrons, thus establishing an excessively high dielectric strength of the gas mixture containing fluoroketone a), and possibly fluoroketone c), and the carrier gas b). The dielectric insulation gas component b) according to the present invention shall thus in particular encompass gases which are capable of decelerating electrons. Such a mechanism may occur preferably, if the carrier gas has a high inelastic electron scattering cross-section at energies below the ionization threshold of the fluoroketone, in particular of fluoroketone a) and/or c). Such a situation is exemplarily shown in FIG. 9 where the peak of electron scattering cross-section of the carrier gas lies energetically below the ionization threshold, which threshold designates the low-energy edge of a substantial rise in the ionization cross-section characteristics of the fluoroketone.

For the sake of clarity, carrier gas or bulk gas can be equal to the dielectric insulation gas component b) or may be one of the dielectric insulation gas component elements b2) of the dielectric insulation gas component b).

In embodiments, the apparatus 2 has a dielectric insulation medium, in which the fluoroketone, in particular at least one fluoroketone a) and optionally the further fluoroketone c), is present in an amount such that a condensation temperature of the fluoroketone is below +5° C., preferably below –5° C., more preferably below –20° C., even more preferably below –30° C., most preferably below –40° C.

In further embodiments, the apparatus 2 has a dielectric insulation medium, which comprises gaseous components in molar volumes or volume concentrations or number densities or molar fractions $m_a$ or partial pressures $p_a$ such that a condensation temperature of the mixture of the gaseous components is below +5° C., preferably below –5° C., more preferably below –20° C., even more preferably below –30° C., most preferably below –40° C.

For sake of clarity: boiling point or boiling point temperature relates to the vapour pressure curve of a component of the insulation medium as a function of temperature, and in particular to the boiling point (temperature) at atmospheric pressure, i.e. at about 1 bar. This is a property of the component as such and describes its vaporization and liquefaction behaviour in particular under atmospheric surrounding pressure conditions.

In contrast, condensation temperature relates to a specific apparatus providing a volume for receiving the dielectric insulation medium, its filling with a specific dielectric insulation medium, in particular the type and amount of the component or components of the dielectric insulation medium, at a given temperature, e.g. the operating temperature or the minimal rated operating temperature, and to the corresponding total pressure of the dielectric insulation medium and the partial pressures of its components. Such a specific apparatus environment may comprise surface roughnesses, electric field inhomogeneities and other factors relevant for dielectric withstand capability or dielectric strength. In such a specific apparatus filled with a specific choice of dielectric insulation medium, condensation temperature defines the temperature at which a gaseous part or phase of the dielectric insulation medium, in particular a group of components in gaseous phase of the dielectric insulation medium, starts to condense into droplets that sit down on inner surfaces of the apparatus and form a liquid "sea" thereon. Such condensation may occur at a common condensation temperature, briefly called condensation temperature, of components of the dielectric insulation medium, even if the boiling points of such components in their pure form may differ by e.g. several 10 K or even by some 50 K. As a result of different boiling points and common condensation temperature, the molar fractions of the components in the gaseous phase and in the liquid phase may vary when condensation starts.

Therefore, the term "condensation temperature" is an integral parameter describing the specific apparatus having a specific filling with the dielectric insulation medium and under specific operating conditions.

In other words, the condensation temperature is determined solely by the nature and number density or molar volume (m³/mol) or volume concentration of the dielectric insulation gas component or components under consideration. The number density or molar volume or molar fraction corresponds to the partial pressures (e.g. $p_a$) present in the apparatus at a given temperature. Thus, the parameters "type of dielectric gas component or gas components" and "number density or molar volumes or partial pressures" determine at what temperature a gas or group of gas components will condense.

In embodiments, it is intended to avoid condensation by the choice of the dielectric insulation medium, in particular the choice of its types and amounts of components, and by the choice of pressures, i.e. partial pressures of the components and the total pressure, possibly by additional filling of a carrier gas or bulk gas, and by the choice of operating conditions, such as temperature. The avoidance of condensation is expressed by the fact that the condensation temperature shall be lower than a minimal operating temperature or a minimal rated operating temperature $T_{min}$ of the apparatus, e.g. lower than +5° C., or −5° C., or −20° C., or −30° C., or −40° C., as stated above.

Figure 10:
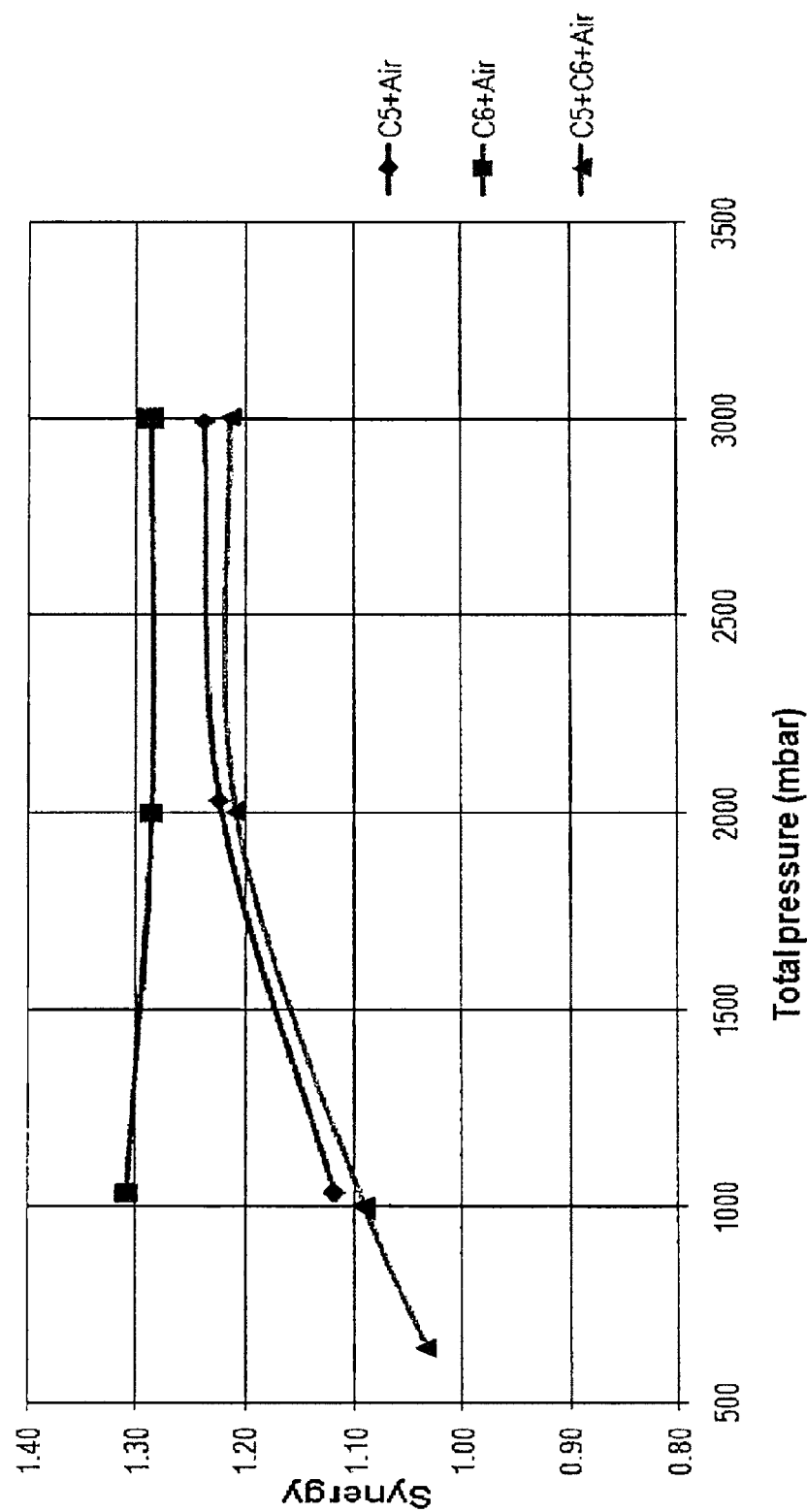
FIG. 10 shows a graphical representation of the synergy factor s as a function of the total pressure for various dielectric insulation media with and without air.

FIG. 10 shows the non-linear or synergy factor s achieved by exemplary dielectric insulation media according to the present invention. The synergy factor s is shown for a first mixture C5-fluoroketone plus air (diamonds), a second mixture C6-fluoroketone plus air (squares), and a third mixture C5-fluoroketone plus C6-fluoroketone plus air (triangles) as a function of the total pressure $p_{abs}$, with the partial pressure $p_a$ of the fluoroketone being kept constant.

For the mixtures containing C5-fluoroketone (first and third mixture) the synergy factor s increases with an increase in the total pressure approximately up to 2 bar total pressure and then remains rather constant at approximately s=1.23, at least up to 3 bar total pressure. In contrast, the second mixture has relatively higher synergy factors of about 1.3 over a wide range of total pressures. As a rule, the synergy factor s is relatively low when the ratio of fluoroketone to air is high and increases with a decrease in the ratio of molar fractions $m_a$ or partial pressures $p_a$ of fluoroketone(s) to dielectric gas component b), here to air.

Please note that there are gas components b) possible which do not produce any non-linear increase of dielectric strength and therefore have a synergy factor of 1.

Figure 11A:
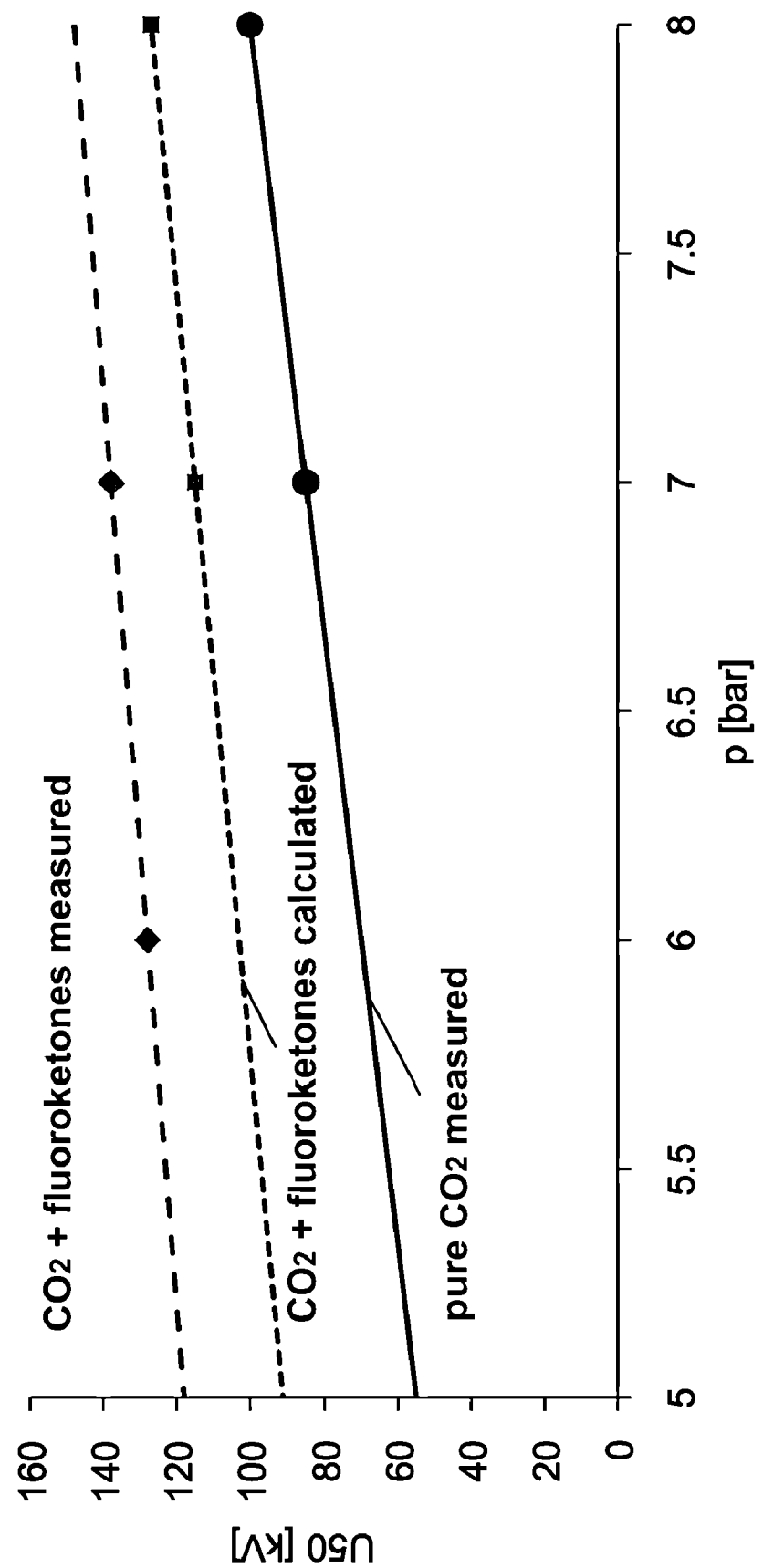
FIGS. 11*a* and 11*b* show graphical representations of measured and calculated breakdown voltages U50 of exemplary dielectric insulation media according to this application in homogenous fields as a function of pressure or fluoroketone content, respectively.

FIG. 11a shows a breakdown voltage U50 in kV as a function of the absolute pressure p in bar for pure carbon dioxide gas $CO_2$ when measured (dots), for a mixture of carbon dioxide gas $CO_2$ with fluoroketones when calculated linearly (squares), i.e. assuming synergy factor=1, and for such a mixture of $CO_2$+FKs when measured (diamonds). The breakdown voltage U50 is defined as the 50% probability of breakdown when a typical lightning impulse, e.g. of 1.2 μs rise and 50 μs fall, with positive polarity is applied in a principal test device with a homogeneous electrode arrangement. In the experiments, the partial pressures of the fluoroketones FKs have been kept constant and were exemplarily chosen to be 0.1 bar C6-fluoroketone and 0.36 bar C5-fluoroketone. The $CO_2$ content was then filled up to the total pressure p indicated on the x-axis. Linear extrapolation lines were drawn to show a trend line for lower absolute pressures p.

The non-linear effect achieved by the dielectric insulation medium comprising C5-fluoroketone and C6-fluoroketone in a mixture with carbon dioxide is clearly visible in FIG. 11a. At 7 bar, a synergy factor, obtained by dividing the measured breakdown field strength or breakdown voltage U50, respectively, by the linearly calculated value, of about s=1.2 is achieved.

Figure 11B:
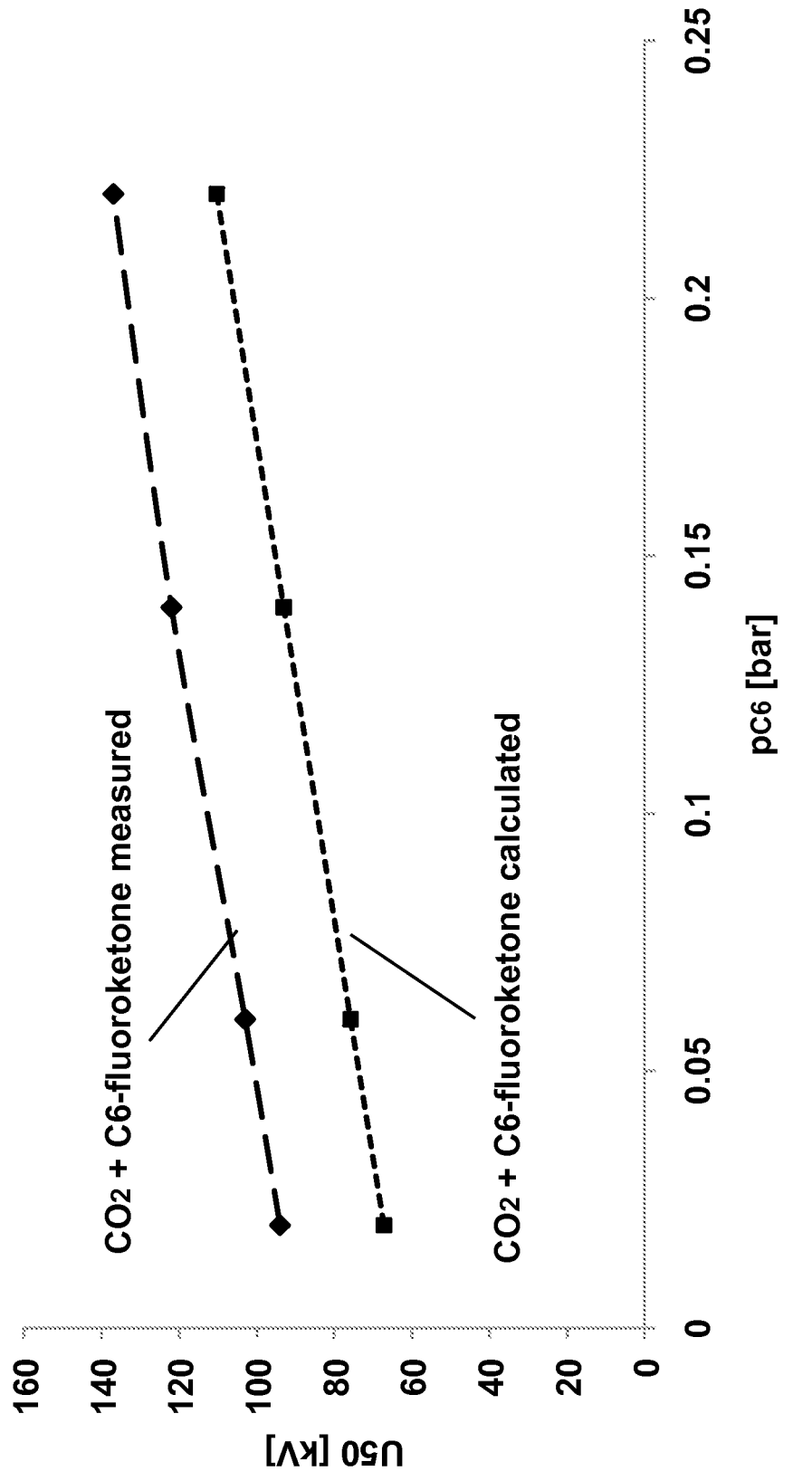

FIG. 11b also shows the existence of the synergistic or non-linear effect achieved by the present invention for a dielectric insulation gas mixture of C6-fluoroketone with carbon dioxide $CO_2$. FIG. 11b shows the breakdown voltage U50 in kV, measured with lightning impulses in a different measurement apparatus, as a function of the partial pressure $p_{C6}$ of the C6-fluoroketone, with the total pressure $p_{abs}$ being kept constant at 1 bar. Again, a strong non-linear increase of the measured dielectric strength of the mixture (diamonds) over the linearly calculated sum of dielectric strengths of the single components, C6 and $CO_2$, (squares) is proven. A strong synergy factor of approximately s=1.35 is found over a wide range of partial pressures $p_a$, or equivalently molar ratios $m_a$, of the C6-fluoroketone.

Figure 12:
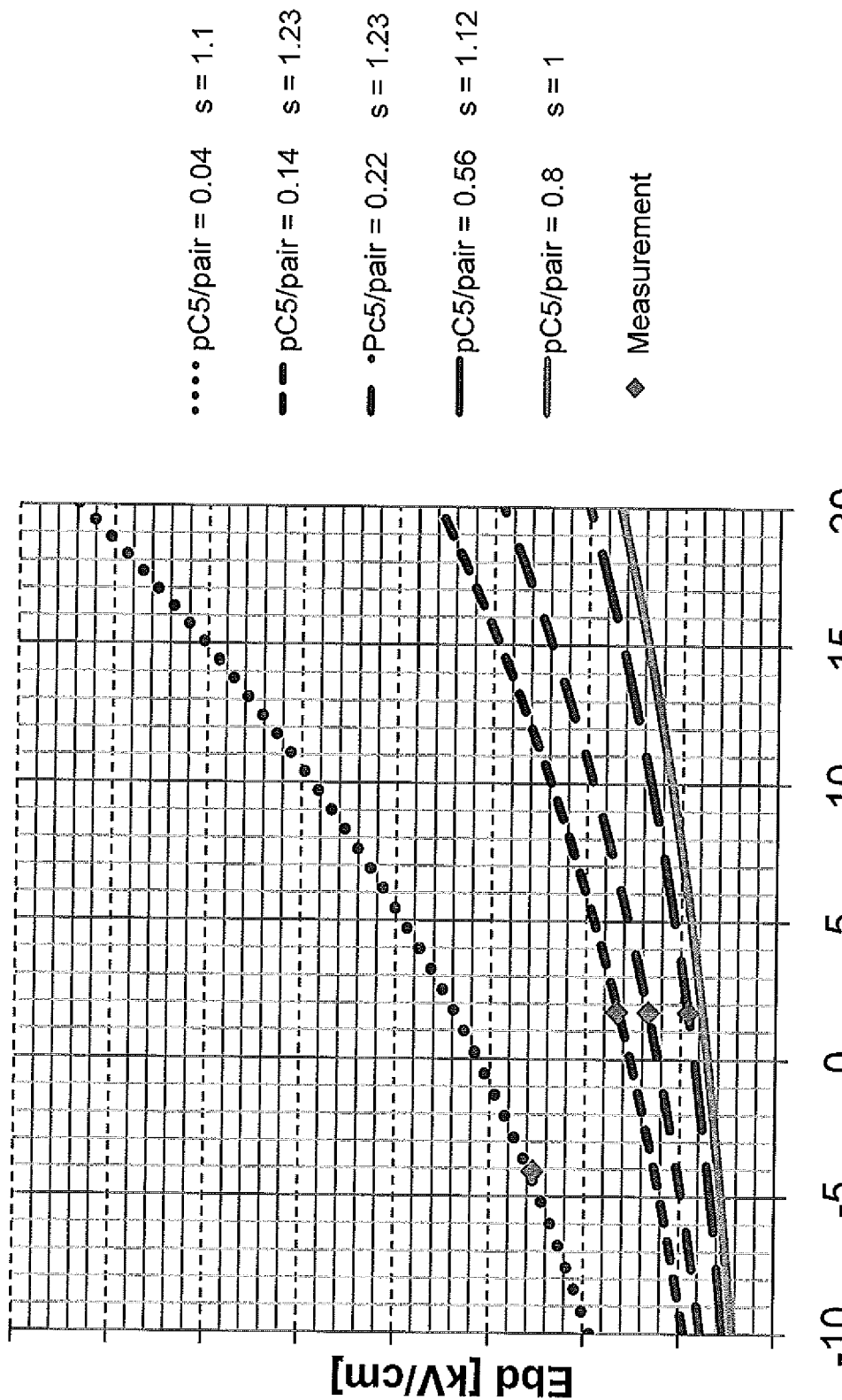
FIG. 12 shows a graphical representation of electric breakdown field strength for exemplary dielectric insulation media comprising a fluoroketone and air in various partial pressure ratios as a function of condensation temperature.

FIG. 12 further illustrates the non-linear increase in dielectric strength of a gas mixture of C5-fluoroketone with air. Here, the breakdown field strength Ebd, corresponding to a breakdown voltage U50 in a given measurement set-up, is determined as a function of condensation temperature $T_{cond}$ for a plurality of ratios $r_1$ to $r_5$ of partial pressures $p_{C5}$ of C5-fluoroketone to partial pressures $p_{air}$ of air, i.e. $r_i=(p_{C5}/p_{air})$ i, with i=number of measurement. These two gas components display a synergy effect according to the synergy factor s=Ebd(measured)/Ebd(linearly calculated) which for a given geometry is approximately a function of the partial pressure ratio r. These measurements were performed by starting with a 360 mbar fill of C5-fluoroketone, which was successively complemented with air for each new measurement. This resulted in the measurements shown for different $p_{C5}/p_{air}$ ratios, for which the synergy factors were measured. Ebd as a function of temperature T was calculated for different condensation temperatures by using the equation Ebd= $[p_{C5}*E_{crit,C5}+p_{air}*E_{crit,air}]*s(p_{C5}/p_{air})$ for fixed ratios $r_i=(p_{C5}/p_{air})_i$ given by the different measurements i=1, . . . , 5. Herein, $p_{C5}$=vapour pressure of C5-fluoroketone at temperature T, $p_{air}$=partial pressure of air, and $s=s(r_i)=s((p_{C5}/p_{air})_i)$= synergy factor s for the mixing ratios $r_i=(p_{C5}/p_{air})_i$.

Ebd(linearly calculated), or $Ebd_{lin.calc.}$, can be expressed according to the following equation:

$$Ebd_{lin.calc.}=p_a \cdot E_{crit,a}+p_b \cdot E_{crit,b}$$

in which
$p_a$ is a partial pressure of the fluoroketone a),
$p_b$ is a partial pressure of the dielectric insulation gas component b),
$E_{crit,a}$ is a pressure-reduced electric breakdown field strength of the fluoroketone a), $E_{crit,b}$ is a pressure-reduced electric breakdown field strength of the dielectric insulation gas component b).

As a specific example, $E_{crit,a}$ of the C5-fluoroketone is 180 kV/(cm*bar), and $E_{crit,b}$ of air is 30 kV/(cm*bar).

The condensation temperature of a given gas mixture depends on the vapour pressure of the high-boiling component, here the C5-fluoroketone. Hence, for a minimum operating temperature of an electrical apparatus of −5° C. the partial pressure of the high-boiling component must lie at or below its vapour pressure at −5° C.

In other words, the condensation temperature $T_{cond}$ on the y-axis corresponds to a partial pressure $p_a$ or molar fraction $m_a$ of the fluoroketone, here C5-fluoroketone, which correspondence is established via the vapour pressure curve of the fluoroketone, here C5-fluoroketone. Such condensation temperature $T_{cond}$ may also correspond to a minimal operating temperature of the electrical apparatus, as discussed above, when liquefaction shall be avoided. Please note that in general throughout this application, the denotations $p_a$=partial pressure and $m_a$=molar fraction of the fluoroketone, e.g. of fluoroketone a) and/or fluoroketone c), and $p_b$=partial pressure and $m_b$=molar fraction of the dielectric gas component b), here air, are also applicable.

In FIG. 12 the small diamonds show measured values of dielectric strengths of the mixture, and the lines show trend lines calculated with the aid of the vapour pressure curve of the C5-fluoroketone. The solid bottom line shows for $r_1=(p_{C5}/p_{air})_1=0.8$ a mixture that does not exhibit any non-linear increase and therefore has a synergy factor s=1. When decreasing the ratio $r=p_{C5}/p_{air}$, e.g. here when increasing the amount of air while keeping the amount of C5-fluoroketone constant, the synergy factor starts to be larger than s=1 over a range of ratios 0.04<r<0.8, reaches a maximum of approximately s=1.23 in a range of ratios 0.1<r<0.3, and then falls again. Specifically, a synergy factor higher than 1 is in the example shown in FIG. 12 obtained for a partial pressure ratio $p_a$ to $p_b$ of 0.04:1, 0.14:1, 0.22:1, and 0.56:1. In particular the ratio r can be selected in a range of 0.01<r<0.8, preferably 0.02<r<0.7, more preferably 0.04<r<0.6.

In summary, a high or ultra-low proportion of C5-fluoroketone results in a low synergy factor (close to 1). An intermediate or lower than high proportion of C5-fluoroketone results in a synergy factor s significantly higher than 1. As a result, the presence of synergy, expressed as the synergy factor s being larger than 1, permits operation of an electrical apparatus at higher electric breakdown field strengths Ebd and/or down to lower temperatures than if no synergy were present. As well, the amount of fluoroketone and/or dielectric gas component b) may be reduced, when a synergy factor larger than 1 is present.

Throughout this application, the following shall apply:

The term carrier gas or bulk gas or buffer gas, which may be comprised in or may be the above mentioned gas component b) or gas component element b1), b2), . . . bn) different from the fluoroketone, shall signify a gaseous part of the dielectric insulation medium that contributes to the dielectric strength, but typically has a dielectric strength weaker than the dielectrically more active or stronger fluoroketone(s). Such carrier gas, e.g. air, nitrogen, or carbon dioxide, typically has a condensation temperature well below the condensation temperature $T_{cond}$ of the fluoroketone(s).

The constituents or components of the dielectric insulation medium, such as various kinds of fluoroketones and carrier gases, are herewith explicitly disclosed to be possible or to be present in any combinations, may it be pair-wise combinations, triplet-wise combinations, quadruplet-wise combinations, or the like. Therefore, any listings of all such combinations are herewith made part of the disclosure.

The terms "preferable", "preferred", "more preferable", "in particular" shall solely mean "exemplary" and shall therefore signify embodiments or examples only, i.e. are to be understood as optional.

The invention claimed is:

1. A dielectric insulation medium comprising a dielectric insulation gas, said insulation gas comprising
   a) a fluoroketone containing exactly 5 carbon atoms, in a mixture with
   b) a dielectric insulation gas component different from said fluoroketone,
   wherein the dielectric gas component is a carrier gas that is present in a larger quantity than the fluoroketone and that together with the fluoroketone provides a non-linear increase of the dielectric strength of the insulation medium over the sum of dielectric strengths of the gas components of the insulation medium.

2. The dielectric insulation medium according to claim 1, the mixture of the gas components having a dielectric strength that is higher than the result of the linear addition of the dielectric strength of each separate gas component of the mixture.

3. The dielectric insulation medium according to claim 1, having a non-linearly increased dielectric strength that is larger than a sum of dielectric strengths of the gas components of the dielectric insulation medium.

4. The dielectric insulation medium according to claim 1, the dielectric insulation gas component being a carrier gas which itself has a lower dielectric strength than the fluoroketone.

5. The dielectric insulation medium according to claim 1, wherein a type and amount of the gas component and an amount of the fluoroketone are chosen such that the non-linear increase of the dielectric strength of the insulation medium over the sum of the dielectric strengths of the gas components of the dielectric insulation medium is achieved.

6. The dielectric insulation medium according to claim 1, a breakdown field strength Ebd of the dielectric insulation medium, in particular of the mixture of its gas components, being defined by the following equation:

$$Ebd=s\cdot(p_a\cdot E_{crita}+p_b\cdot E_{critb})$$

in which
   $p_a$ is a partial pressure of the fluoroketone,
   $p_b$ is a partial pressure of the dielectric insulation gas component,
   $E_{crit,a}$ is a pressure-reduced electric breakdown field strength of the fluoroketone,
   $E_{crit,b}$ is a pressure-reduced electric breakdown field strength of the dielectric insulation gas component,
   s is a synergy factor $Ebd_{measured}/Ebd_{lin.calc}$, with $Ebd_{measured}$ being a measured breakdown field strength of the dielectric insulation medium, in particular of the mixture of its gas components, and $Ebd_{lin.calc}$ being a linearly calculated sum of the electric breakdown field strengths of the fluoroketone and the dielectric gas component,
   wherein the mixture is chosen such that the synergy factor s is greater than 1.

7. The dielectric insulation medium according to claim 6, wherein the breakdown field strength Ebd of the dielectric insulation medium, in particular of the mixture of its gas components, the pressure-reduced electric breakdown field strength $E_{crit,a}$ of the fluoroketone, and the pressure-reduced electric breakdown field strength $E_{crit,b}$ of the dielectric insulation gas component are determined in a first similar measurement apparatus, and in particular are determined in an electrical apparatus in which the dielectric insulation medium is to be used.

8. The dielectric insulation medium according to claim 6, wherein the measured breakdown field strength $Ebd_{measured}$ of the dielectric insulation medium, in particular of the mixture of its gas components, and the linearly calculated sum $Ebd_{lin.calc}$ of the electric breakdown field strengths of the gas components, in particular fluoroketone and the dielectric gas component, are determined in a second similar measurement apparatus, and in particular are determined in an electrical apparatus in which the dielectric insulation medium is to be used.

9. The dielectric insulation medium according to claim 6, wherein a type and amount of the gas component and an amount of the fluoroketone are chosen such that the synergy factor s is greater than 101%.

10. The dielectric insulation medium according to claim 6, the synergy factor s being dependent on the ratio r of the partial pressure $p_a$ of the fluoroketone to the partial pressure $p_b$ of the dielectric insulation gas component.

11. The dielectric insulation medium, in particular according to claim 1, the dielectric insulation medium comprising
a) a fluoroketone containing exactly 5 carbon atoms, in a mixture with
b) a dielectric insulation gas component different from said fluoroketone,
wherein the dielectric gas component is a carrier gas that is present in a larger quantity than the fluoroketone and that together with the fluoroketone provides a non-linear increase of the dielectric strength of the insulation medium over the sum of dielectric strengths of the gas components of the insulation medium,
the dielectric insulation gas component being or comprising air or an air component, in particular nitrogen.

12. The dielectric insulation medium according to claim 11, the dielectric insulation gas component comprising oxygen.

13. The dielectric insulation medium according to claim 11, the dielectric insulation gas component comprising carbon dioxide.

14. The dielectric insulation medium according to claim 12, the dielectric insulation medium being an arc-extinguishing gas for a circuit breaker.

15. The dielectric insulation medium according to claim 12, the molar fraction of oxygen being at or below 40%.

16. The dielectric insulation medium according to claim 1, the fluoroketone being a perfluoroketone, and/or the fluoroketone having a branched alkyl chain, and/or the fluoroketone being a fully saturated compound.

17. The dielectric insulation medium according to claim 1, the fluoroketone being at least one compound selected from the group consisting of the compounds defined by the following structural formulae in which at least one hydrogen atom is substituted with a fluorine atom:

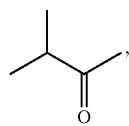
(Ia)

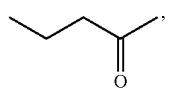
(Ib)

(Ic) and

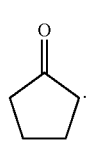
(Id)

18. The dielectric insulation medium according to claim 1, the fluoroketone having the molecular formula $C_5F_{10}O$ and, in particular, being selected from the group consisting of 1,1,1,3,4,4,4-heptafluoro-3-(trifluoromethyl)butan-2-one, 1,1,1,3,3,4,4,5,5,5-decafluoropentan-2-one, 1,1,1,2,2,4,4,5,5,5-decafluoropentan-3-one, and 1,1,1,4,4,5,5,5,-octafluoro-3-bis(trifluoromethyl)-pentan-2-one.

19. The dielectric insulation medium according to claim 1, the molar fraction of the fluoroketone in the insulation medium being larger than 1%.

20. The dielectric insulation medium according to claim 1, wherein the fluoroketone is in a gaseous phase in the insulation medium under operating conditions.

21. The dielectric insulation medium according to claim 1, wherein the dielectric insulation medium is a dielectric insulation gas under over-pressure of less than 8 bar; or wherein the dielectric insulation medium is a dielectric insulation gas under over-pressure of less than 2.5 bar.

22. The dielectric insulation medium according to claim 1, the dielectric insulation gas component having an atmospheric boiling point of at least 50 K below an atmospheric boiling point of the fluoroketone.

23. The dielectric insulation medium according to claim 1, the dielectric insulation gas component
A) being inert and/or non-toxic and/or non-flammable; and/or
B) having a dielectric strength of more than 10 kV/(cm bar); and/or
C) having an ozone depletion potential of 0.

24. The dielectric insulation medium according to claim 1, the dielectric insulation gas component: having a global warming potential GWP over 100 years of less than 1000.

25. The dielectric insulation medium according to claim 1, the dielectric insulation gas component comprising a mixture of at least two gas component elements.

26. The dielectric insulation medium according to claim 1, the dielectric insulation gas component comprising molecules with less atoms than present in the fluoroketone, in particular comprising tri-atomic and/or di-atomic molecules or consisting of tri-atomic and/or di-atomic molecules.

27. The dielectric insulation medium according to claim 1, the fluoroketone having an energy-dependent ionization cross-section with an ionization energy threshold, the dielectric insulation gas component having an energy-dependent electron scattering cross-section with a peak at a specific energy, wherein the specific energy of the dielectric insulation gas component lies below the ionization energy threshold of the fluoroketone.

28. The dielectric insulation medium according to claim 1, further comprising
a further fluoroketone different from the fluoroketone.

29. The dielectric insulation medium according to claim 28, the further fluoroketone being different from the dielectric insulation gas component.

30. The dielectric insulation medium according to claim 28, the further fluoroketone containing exactly 5 carbon atoms or exactly 6 carbon atoms or exactly 7 carbon atoms or exactly 8 carbon atoms.

31. The dielectric insulation medium according to claim 30, the further fluoroketone being at least one compound selected from the group consisting of the compounds defined by the following structural formulae in which at least one hydrogen atom is substituted with a fluorine atom:

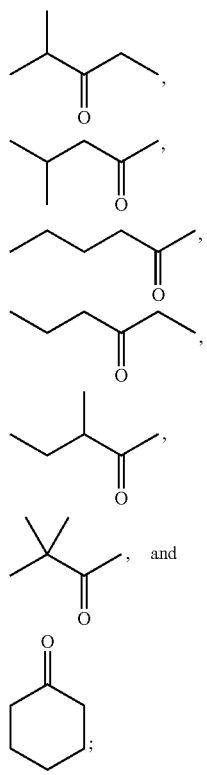

and/or being at least one compound selected from the group consisting of the compounds defined by the following structural formulae in which at least one hydrogen atom is substituted with a fluorine atom:

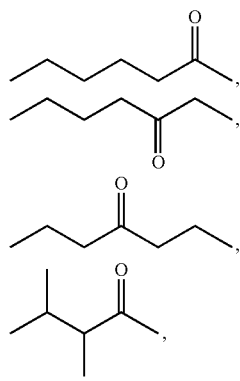

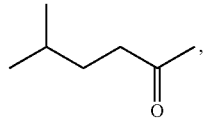
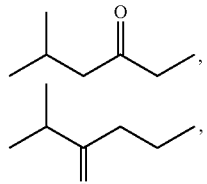
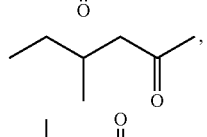
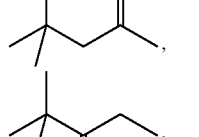
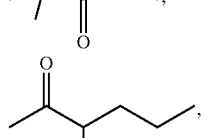
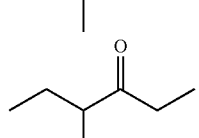
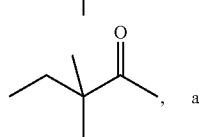
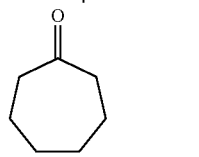
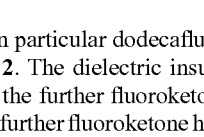
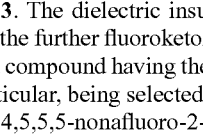
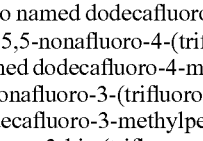

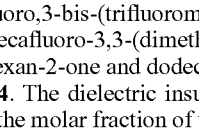

in particular dodecafluoro-cycloheptanone.

32. The dielectric insulation medium according to claim 28, the further fluoroketone being a perfluoroketone, and/or the further fluoroketone having a branched alkyl chain, and/or the fluoroketone being a fully saturated compound.

33. The dielectric insulation medium according to claim 28, the further fluoroketone being decafluoro-cyclohexanone or a compound having the molecular formula $C_6F_{12}O$ and, in particular, being selected from the group consisting of 1,1,1,2,4,4,5,5,5-nonafluoro-2-(trifluoromethyl)pentan-3-one (also named dodecafluoro-2-methylpentan-3-one), 1,1,1,3,3,4,5,5,5-nonafluoro-4-(trifluoromethyl)pentan-2-one (also named dodecafluoro-4-methylpentan-2-one), 1,1,1,3,4,4,5,5,5-nonafluoro-3-(trifluoromethyl)pentan-2-one (also named dodecafluoro-3-methylpentan-2-one), 1,1,1,3,4,4,4-heptafluoro-3-bis-(trifluoromethyl)butan-2-one (also named dodecafluoro-3,3-(dimethyl)butan-2-one), and dodecafluorohexan-2-one and dodecafluorohexan-3-one.

34. The dielectric insulation medium according to claim 28, the molar fraction of the further fluoroketone in the insulation medium being larger than 0.1%.

35. The dielectric insulation medium according to claim 28, the molar fraction of the further fluoroketone in the insulation medium ranging from 1% to 15%.

36. The dielectric insulation medium according to claim 1, the partial pressure of each of the fluoroketone corresponding at least approximately to its respective saturated vapour pressure at a minimal operating temperature of the dielectric insulation medium.

37. The dielectric insulation medium according to claim 1, the ratio of the molar fraction of oxygen to the molar fraction of the fluoroketone being at least 2:1.

38. The dielectric insulation medium according to claim 1, the dielectric insulation medium, in particular dielectric insulation gas, having a global warming potential GWP over 100 years of less than 100.

39. An apparatus for the generation and/or transmission and/or distribution and/or usage of electrical energy, in particular a medium or high voltage apparatus, said apparatus comprising a housing defining an insulating space and an electrical active part arranged in the insulating space, said insulating space comprising an insulation medium, characterized by the dielectric insulation medium according to claim 1.

40. The apparatus according to claim 39, characterized in that the apparatus is a switchgear, in particular an air-insulated or a gas-insulated metal-encapsulated switchgear or a hybrid switchgear or a medium voltage block switchgear or a ring-main-unit, or a dead tank breaker or a PASS-module (plug-and-switch module), or a part or component thereof, in particular a bus bar, a bushing, a cable, a gas-insulated cable, a cable joint, a current transformer, a voltage transformer, a surge arrester and/or a gas insulated transmission line.

41. The apparatus according to claim 39, characterized in that the apparatus is a switch, in particular an earthing switch, a disconnector, a combined disconnector and earthing switch, a load-break switch and/or a circuit breaker.

42. The apparatus according to claim 41, characterized in that the apparatus is a high voltage circuit breaker having a pressure-build-up chamber for providing pressurized arc-extinguishing gas,
in particular comprising
the fluoroketone in a mixture with
carbon dioxide and/or
air or oxygen,
and that in a switching operation the fluoroketone is decomposed to fluorocarbon compounds having a lower number of carbon atoms during an arc-extinguishing phase.

43. The apparatus according to claim 39, characterized in that the apparatus is a transformer, in particular a distribution transformer or a power transformer.

44. The apparatus according to claim 39, characterized in that the apparatus is an electrical rotating machine, a generator, a motor, a drive, a semiconducting device, a power electronics device, and/or a component thereof.

45. The apparatus according to claim 39, characterized in that it further comprises a control unit for controlling individually or in combination: a composition, a temperature, an absolute pressure, a partial pressure, a gas density and/or a partial gas density of the insulating medium or of at least one of its components, respectively.

46. The apparatus according to claim 45, characterized in that the control unit comprises a heater and/or vaporizer for controlling the partial pressure of the fluoroketone, in particular, for maintaining it above a required partial pressure level.

47. The apparatus according to claim 45, characterized in that the control unit comprises a temperature control unit comprising a heating system for setting the housing, or at least a part of the housing, of the apparatus to a desired temperature, and/or the control unit comprises a fluid handling unit for dosing a concentration of the fluoroketone and for injecting the resulting insulation medium into the apparatus.

48. The apparatus according to claim 39, characterized by the apparatus having a reserve volume of liquid fluoroketone, and/or having means for limiting a maximal permissible operating temperature of the desired insulation medium such that the absolute filling pressure is maintained below a given pressure limit of the apparatus.

49. The apparatus according to claim 39, characterized by the apparatus having an inhomogeneous electric field distribution, and/or having a conventional pressure design for being filled with sulphur hexafluoride $SF_6$ and is instead filled with the dielectric insulation medium.

50. The apparatus according to claim 39, characterized in that in the dielectric insulation medium fluoroketone is present in an amount such that a condensation temperature of the fluoroketone is below a rated operating temperature of the apparatus, in particular below +5° C.

51. The apparatus according to claim 39, characterized in that the dielectric insulation medium comprises gaseous components in an amount such that a condensation temperature of the mixture of the gaseous components is below a rated operating temperature of the apparatus, in particular is below +5° C.

52. The apparatus, in particular according to claim 39,
a) the apparatus having a rating characterized by rating parameters, which comprise an electric field strength $E_{app}$ required in a space to be filled by the dielectric insulation medium, a minimal rated operating temperature $T_{min}$, a maximal rated operating temperature $T_{max}$, and a maximal permissible gas pressure $p_{max}$,
b) the apparatus comprising a dielectric insulation gas comprising a fluoroketone in a mixture with a dielectric insulation gas component different from said fluoroketone, with the mixture having a non-linearly increased dielectric strength characterized by a synergy factor s,
c) the dielectric insulation gas, in particular the mixture, having characteristic parameters being defined by a type, partial pressure $p_a$, or in particular corresponding number density, and pressure-reduced electric breakdown field strength $E_{crit,a}$ of the fluoroketone, and a type, partial pressure $p_b$, or in particular corresponding number density, and pressure-reduced electric breakdown field strength $E_{crit,b}$ of the dielectric insulation gas component,
d) a linear pressure-reduced breakdown field strength $Ebd_{lin,calc}$ of the dielectric insulation gas, in particular the mixture, being calculated as a function of the partial pressure $p_a$ of the fluoroketone by a partial-pressure-weighted sum of the pressure-reduced electric breakdown field strengths $E_{crit,a}$ and $E_{crit,b}$,
e) from the electric field strength $E_{app}$ and from the linear pressure-reduced breakdown field strength $Ebd_{lin,calc}$ an absolute pressure curve $p_{abs}(p_a)$ of the dielectric insulation gas being determined as a function of the partial pressures $p_a$ of the fluoroketone,
f) an absolute filling pressure $p_{abs}$ of the insulation gas at a standard temperature and therefrom and from the absolute pressure curve $p_{abs}(p_a)$ a first partial pressure $p_{a1}$, or in particular a first corresponding number density, of the fluoroketone being determined, and g) at least one of the rating parameters of the electric apparatus being extended due to the synergy factor of the mixture being larger than 1.

53. The apparatus according to claim 52,
a) a second partial pressure $p_{a2}$, or in particular a second corresponding number density, of the fluoroketone being determined such that a condensation temperature of the fluoroketone in the insulation gas is below the minimal rated operating temperature $T_{min}$, and
b) if the first partial pressure $p_{a1}$ is equal to or lower than the second partial pressure $p_{a2}$, then selecting the partial pressure $p_a$ of the fluoroketone in a range such that $p_{a1} \leq p_a \leq p_{a2}$, or
c) if the first partial pressure $p_{a1}$ is larger than the second partial pressure $p_{a2}$, then:
  i. selecting the partial pressure $p_a$ of the fluoroketone smaller than or equal to the second partial pressure $p_{a2}$ and increasing the absolute pressure $p_{abs}$, in particular increasing the absolute pressure $p_{abs}$ equal to $p_{abs}(p_{a2})$ by increasing the partial pressure $p_b$ of the dielectric insulation gas component, and/or
  ii. increasing the minimal operating temperature $T_{min}$ by heating and thereby increasing the second partial pressure $p_{a2}$ to a higher value, and in particular increasing the second partial pressure $p_{a2}$ to a value equal to or above the first partial pressure $p_{a1}$ and then selecting the partial pressure $p_a$ of the fluoroketone in a range such that $p_{a1} \leq p_a \leq p_{a2}$.

54. The apparatus according to claim 52,
a) a value of the synergy factor s being determined for the mixture, in particular for a ratio of the partial pressure $p_a$ of the fluoroketone to the partial pressure $p_b$ of the dielectric gas component being present in the electrical apparatus, and
b) a rating extension being performed by at least one of the following measures: the maximal electric field strength $E_{app}$ being increased, the minimal rated operating temperature $T_{min}$ being decreased, the absolute filling $p_{abs}$ pressure decreased, the partial pressure $p_a$ or molar fraction $m_a$ of the fluoroketone present in the electrical apparatus being reduced, a safety margin being increased, and combinations thereof.

55. A method for dimensioning an electrical apparatus, in particular an apparatus as defined in claim 39, characterized by the steps of
a) selecting for the apparatus a rating characterized by rating parameters, which comprise an electric field strength $E_{app}$ required in a space to be filled by the dielectric insulation medium, a minimal rated operating temperature $T_{min}$, a maximal rated operating temperature $T_{max}$, and a maximal permissible gas pressure $p_{max}$,
b) selecting a dielectric insulation gas comprising a fluoroketone in a mixture with a dielectric insulation gas component different from said fluoroketone, with the mixture having a non-linearly increased dielectric strength characterized by a synergy factor s,
c) the dielectric insulation gas, in particular the mixture, having characteristic parameters being defined by the type, partial pressure $p_a$, or in particular corresponding number density, and pressure-reduced electric breakdown field strength $E_{crit,a}$ of the fluoroketone, and the type, partial pressure $p_b$, or in particular corresponding number density, and pressure-reduced electric breakdown field strength $E_{crit,b}$ of the gas component,
d) calculating a linear pressure-reduced breakdown field strength $Ebd_{lin.calc}$ of the dielectric insulation gas, in particular the mixture, as a function of the partial pressure $p_a$ of the fluoroketone by a partial-pressure-weighted sum of the pressure-reduced electric breakdown field strengths $E_{crit,a}$ and $E_{crit,b}$,
e) determining from the electric field strength $E_{app}$ and from the linear pressure-reduced breakdown field strength $Ebd_{lin.calc}$ an absolute pressure curve $p_{abs}(p_a)$ of the dielectric insulation gas as a function of the partial pressure $p_a$ of the fluoroketone,
f) selecting an absolute filling pressure $p_{abs}$ of the insulation gas at a standard temperature and determining therefrom and from the absolute pressure curve $p_{abs}(p_a)$ a first partial pressure $p_{a1}$, or in particular a first corresponding number density, of the fluoroketone,
g) extending at least one of the rating parameters of the electric apparatus due to the synergy factor of the mixture being larger than 1.

56. The method for dimensioning an electrical apparatus according to claim 55, further characterized by the steps of
a) determining a second partial pressure $p_{a2}$, or in particular a second corresponding number density, of the fluoroketone such that a condensation temperature of the fluoroketone in the insulation gas is below the minimal rated operating temperature $T_{min}$, and
b) if the first partial pressure $p_{a1}$ is equal to or lower than the second partial pressure $p_{a2}$, then selecting the partial pressure $p_a$ of the fluoroketone in a range such that $p_{a1} \leq p_a \leq p_{a2}$, or
c) if the first partial pressure $p_{a1}$ is larger than the second partial pressure $p_{a2}$, then:
  i. selecting the partial pressure $p_a$ of the fluoroketone smaller than or equal to the second partial pressure $p_{a2}$ and increasing the absolute pressure $p_{abs}$, in particular increasing the absolute pressure $p_{abs}$ equal to $p_{abs}(p_{a2})$, by increasing the partial pressure $p_b$ of the dielectric insulation gas component, and/or
  ii. increasing the minimal operating temperature $T_{min}$ by heating and thereby increasing the second partial pressure $p_{a2}$ to a higher value, and in particular increasing the second partial pressure $p_{a2}$ to a value equal to or above the first partial pressure $p_{a1}$ and then selecting the partial pressure $p_a$ of the fluoroketone in a range such that $p_{a1} \leq p_a \leq p_{a2}$.

57. The method for dimensioning an electrical apparatus according to claim 55, further characterized by the steps of
a) determining a value of the synergy factor s for the mixture, in particular for a ratio of the partial pressure $p_a$ of the fluoroketone to the partial pressure $p_b$ of the dielectric gas component, and
b) performing a rating extension by at least one of the following steps: increasing the electric field strength $E_{app}$, decreasing the minimal rated operating temperature $T_{min}$, decreasing the absolute filling pressure $p_{abs}$, reducing the partial pressure $p_a$ or molar fraction $m_a$ of the fluoroketone, increasing a safety margin, and combinations thereof.

58. The method for dimensioning an electrical apparatus according to claim 55, further characterized by the steps of
a) selecting the fluoroketone to comprise a fluoroketone containing exactly 5 carbon atoms, and/or to comprise a further fluoroketone containing exactly 6 carbon atoms, and/or
b) selecting the dielectric gas component to comprise at least one of the components selected from the group: air, nitrogen, carbon dioxide, and mixtures thereof.

59. The apparatus according to claim 50, wherein the condensation temperature of the fluoroketone is below −5° C.

60. The apparatus according to claim 51, wherein the condensation temperature of the mixture of the gaseous components is below −5° C.

61. The dielectric insulation medium according to claim 6, wherein a type and amount of the gas component and an amount of the fluoroketone are chosen such that the synergy factor s is greater than 105%.

62. The dielectric insulation medium according to claim 12, the dielectric insulation gas component comprising carbon dioxide.

63. The dielectric insulation medium according to claim 13, the dielectric insulation gas component comprising oxygen and the molar fraction of oxygen being at or below 20%.

64. The dielectric insulation medium according to claim 63, the dielectric insulation medium being an arc-extinguishing gas for a circuit breaker.

65. The dielectric insulation medium according to claim 19, the molar fraction of the fluoroketone in the insulation medium being larger than 3%.

66. The dielectric insulation medium according to claim 19, the molar fraction of the fluoroketone in the insulation medium being larger than 5%.

67. The dielectric insulation medium according to claim 1, wherein the dielectric insulation medium is a dielectric insulation gas under over-pressure of less than 6.5 bar; or wherein the dielectric insulation medium is a dielectric insulation gas under over-pressure of less than 1.5 bar.

68. The dielectric insulation medium according to claim 1, the dielectric insulation gas component having a global warming potential GWP over 100 years of less than 3.

69. The dielectric insulation medium according to claim 28, the molar fraction of the further fluoroketone in the insulation medium being larger than 1%.

70. The dielectric insulation medium according to claim 1, the dielectric insulation medium, in particular dielectric insulation gas, having a global warming potential GWP over 100 years of less than 10.

71. The apparatus according to claim 47, characterized by the apparatus having a reserve volume of liquid fluoroketone, and/or having means for limiting a maximal permissible operating temperature of the desired insulation medium such that the absolute filling pressure is maintained below a given pressure limit of the apparatus.

72. The dielectric insulation medium according to claim 13, dielectric insulation gas component comprising oxygen and the molar fraction of the oxygen being at or below 30%.

73. The dielectric insulation medium according to claim 1, wherein the dielectric insulation medium is a dielectric insulation gas under over-pressure of less than 7.5 bar; or wherein the dielectric insulation medium is a dielectric insulation gas under over-pressure of less than 2 bar.

74. The dielectric insulation medium according to claim 1, the dielectric insulation gas component having a dielectric strength of more than 30 kV/(cm bar).

75. The dielectric insulation medium according to claim 1, the dielectric insulation gas component having a global warming potential GWP over 100 years of less than 300.

76. The dielectric insulation medium according to claim 6, wherein a type and amount of the gas component and an amount of the fluoroketone are chosen such that the synergy factor s is greater than 110%.

* * * * *